(12) United States Patent
Harada et al.

(10) Patent No.: US 12,287,203 B2
(45) Date of Patent: Apr. 29, 2025

(54) MOUNTING STRUCTURE OF MICRO VIBRATOR

(71) Applicants: DENSO CORPORATION, Kariya (JP); TOYOTA JIDOSHA KABUSHIKI KAISHA, Toyota (JP); MIRISE Technologies Corporation, Nisshin (JP)

(72) Inventors: Shota Harada, Nisshin (JP); Keitaro Ito, Nisshin (JP); Hideaki Nishikawa, Nisshin (JP); Yuuki Inagaki, Nisshin (JP); Katsuaki Goto, Nisshin (JP); Takahiko Yoshida, Nisshin (JP); Yusuke Kawai, Nisshin (JP)

(73) Assignees: DENSO CORPORATION, Kariya (JP); TOYOTA JIDOSHA KABUSHIKI KAISHA, Toyota (JP); MIRISE Technologies Corporation, Nisshin (JP)

( * ) Notice: Subject to any disclaimer, the term of this patent is extended or adjusted under 35 U.S.C. 154(b) by 275 days.

(21) Appl. No.: 18/169,438

(22) Filed: Feb. 15, 2023

(65) Prior Publication Data
US 2023/0288203 A1 Sep. 14, 2023

(30) Foreign Application Priority Data
Mar. 8, 2022 (JP) .................................. 2022-035318

(51) Int. Cl.
*G01C 19/5712* (2012.01)

(52) U.S. Cl.
CPC .............................. *G01C 19/5712* (2013.01)

(58) Field of Classification Search
CPC ............ G01C 19/5712; G01C 19/5783; G01C 19/5691; B81B 7/007; B81B 3/0018; B81C 99/0035
See application file for complete search history.

(56) References Cited

U.S. PATENT DOCUMENTS

| | | | |
|---|---|---|---|
| 2018/0188030 A1* | 7/2018 | Shang | G01C 19/5691 |
| 2019/0094024 A1 | 3/2019 | Najafi et al. | |
| 2020/0309527 A1 | 10/2020 | Shkel et al. | |
| 2022/0187072 A1* | 6/2022 | Akashi | B81C 1/00634 |
| 2022/0316880 A1* | 10/2022 | Harada | G01C 19/5691 |
| 2022/0373332 A1* | 11/2022 | Inagaki | G01P 1/00 |

* cited by examiner

*Primary Examiner* — David J Bolduc
(74) *Attorney, Agent, or Firm* — Posz Law Group, PLC

(57) ABSTRACT

In a mounting structure, a micro vibrator has: a curved surface portion having a hemispherical curved surface; a connecting portion extending from the curved surface portion toward a center of a hemispherical shape of the curved surface portion; and a surface electrode covering at least a part of the connecting portion and at least a part of the curved surface portion. A mounting substrate has two or more wirings and a part of the micro vibrator is connected to the mounting substrate. The wirings each have an electrode connection portion connected to a portion of the surface electrode covering the connecting portion at an end. The two or more wirings include a voltage application wiring and a voltage detection wiring. The voltage application wiring is spaced away from the voltage detection wiring on the mounting substrate.

5 Claims, 15 Drawing Sheets

MOUNTING STRUCTURE OF MICRO VIBRATOR

CROSS REFERENCE TO RELATED APPLICATION

The present application claims the benefit of priority from Japanese Patent Application No. 2022-035318 filed on Mar. 8, 2022. The entire disclosures of the above application are incorporated herein by reference.

TECHNICAL FIELD

The present disclosure relates to a mounting structure of a micro vibrator having a three-dimensional curved surface.

BACKGROUND

In recent years, a system for an automated driving of a vehicle has been developed. Such a system requires a technique of estimating its position with high accuracy. For example, a self-position estimation system equipped with a global navigation satellite system (GNSS) and an internal measurement unit (IMU) has been developed for so-called level 3 automated driving. The IMU is, for example, a six-axis inertial sensor composed of a three-axis gyro sensor and a three-axis acceleration sensor. In the future, in order to realize a level 4 or higher automated driving, an IMU with higher sensitivity than the current system is required.

For realizing such a highly sensitive IMU, a bird-bath resonator gyroscope (BRG) is considered to be a promising gyro sensor. The BRG has a mounting substrate and a micro vibrator mounted on the mounting substrate. The micro vibrator has substantially a hemispherical three-dimensional curved surface and vibrates in a wine-glass mode. This micro vibrator has a Q factor, which represents a vibration state, of $10^6$ or more. Therefore, this micro vibrator is expected to achieve a higher sensitivity than a previous micro vibrator.

SUMMARY

The present disclosure describes a mounting structure of a micro vibrator on a mounting substrate. According to an aspect of the present disclosure, the micro vibrator has a curved surface portion with a hemispherical curved surface, a connecting portion extending from the curved surface portion toward a center of a hemispherical shape of the curved surface portion, and a surface electrode covering the connecting portion at least at a part and the curved surface portion at least at a part. The mounting substrate has two or more wirings and a part of the micro vibrator is connected to the mounting substrate. The two or more wirings each have an electrode connection portion connected to a portion of the surface electrode covering the connecting portion at an end. The two or more wirings include a voltage application wiring for applying a voltage to the surface electrode and a voltage detection wiring for detecting the voltage applied to the surface electrode. The voltage application wiring is spaced away from the voltage detection wiring on the mounting substrate.

BRIEF DESCRIPTION OF THE DRAWINGS

The above and other objects, features and advantages of the present disclosure will become more apparent from the following detailed description made with reference to the accompanying drawings, in which like parts are designated by like reference numbers and in which.

DETAILED DESCRIPTION

Figure 1:
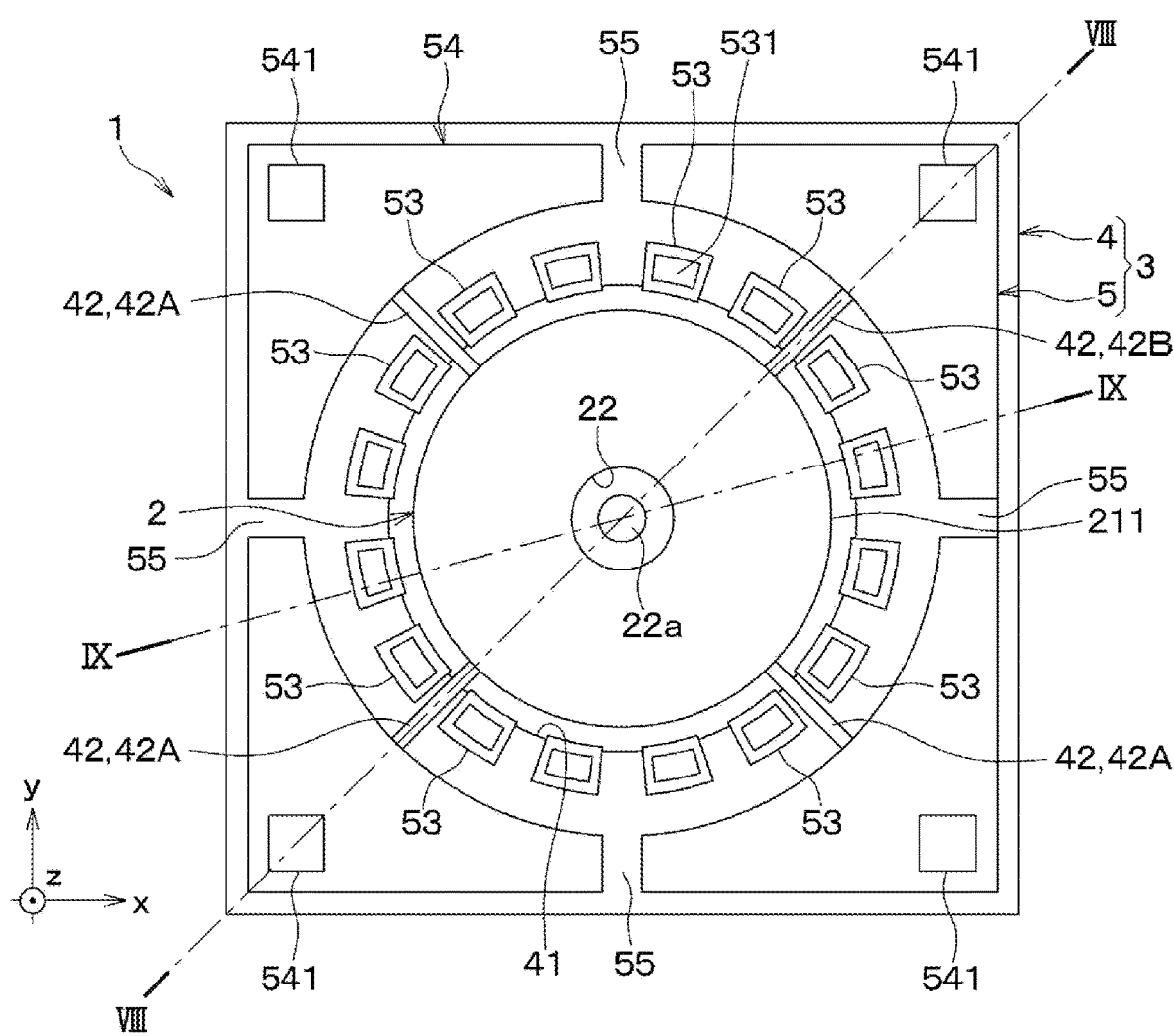
FIG. 1 is a diagram showing a top layout of a mounting structure according to a first embodiment.

To begin with, a relevant technology will be described only for understanding the embodiments of the present disclosure.

For realizing a highly sensitive IMU, a bird-bath resonator gyroscope (BRG) is considered to be a promising gyro sensor. The BRG has a mounting substrate and a micro vibrator mounted on the mounting substrate. The micro vibrator has substantially a hemispherical three-dimensional curved surface and vibrates in a wine-glass mode. This micro vibrator has a Q factor, which represents a vibration state, of $10^6$ or more. Therefore, such a micro vibrator is expected to achieve a higher sensitivity than a previous micro vibrator.

As an example of a micro vibrator for achieving a higher sensitivity, there is a mounting structure having a micro vibrator and a mounting substrate on which the micro vibrator is mounted. The micro vibrator has substantially a hemispherical three-dimensional curved surface and a bonding portion extending from the vicinity of the top of the hemispherical three-dimensional shape toward the center of the hemispherical shape. The bonding portion has a bottomed tubular shape and defines a recess recessing from the top of the hemispherical three-dimensional shape of the curved surface. The bonding portion is inserted into a bonding area of the mounting substrate surrounded by a substantially annular frame. In this mounting structure, a surface electrode covering the entire surface of the micro vibrator and a wiring formed in the bonding area of the mounting substrate are bonded to each other, so that a predetermined voltage can be applied to the surface electrode of the micro vibrator via the wiring of the mounting substrate.

In the BRG, the micro vibrator is bonded to the bonding area to which the wiring is electrically connected on the mounting substrate, so that the voltage is applied to the surface electrode of the micro vibrator via the wiring on the mounting substrate. Therefore, a bonding reliability between the micro vibrator and the mounting substrate is important in order to ensure stability of voltage application. Moreover, in such a mounting structure, in order to confirm whether or not the voltage is applied to the surface electrode of the micro vibrator, it is necessary to detect the voltage by connecting a probe to a portion of the surface electrode other than the bonding portion with the mounting substrate.

However, if the probe is brought into direct contact with the surface electrode of the micro vibrator, the surface electrode or a base covered with the surface electrode may be damaged. Also, if the surface electrode or the base is damaged, the Q factor of the micro vibrator is likely to be lowered. Furthermore, for example, when a cover is attached to the mounting substrate and the micro vibrator is enclosed, the probe cannot be brought into contact with the surface electrode of the micro vibrator, and hence the voltage applied to the surface electrode cannot be detected.

The present disclosure provide a mounting structure of a micro vibrator having a three-dimensional curved shape and including a surface electrode covering a surface thereof on a mounting substrate, which enables to detect an application voltage to the surface electrode without requiring contact to a portion of the surface electrode other than a bonding portion with the mounting substrate.

According to an aspect of the present disclosure, a mounting structure includes a micro vibrator and a mounting substrate. The micro vibrator has a curved surface portion with a hemispherical curved surface, a connecting portion extending from the curved surface portion toward a center of a hemispherical shape of the curved surface portion, and a surface electrode covering the connecting portion at least at a part and the curved surface portion at least at a part. The mounting substrate has two or more wirings and a part of the micro vibrator is connected to the mounting substrate. The two or more wirings each have an electrode connection portion connected to a portion of the surface electrode covering the connecting portion at an end. The two or more wirings include a voltage application wiring for applying a voltage to the surface electrode and a voltage detection wiring for detecting the voltage applied to the surface electrode. The voltage application wiring is spaced away from the voltage detection wiring on the mounting substrate.

In the mounting structure according to the aspect described above, the portion of the surface electrode covering the connecting portion of the micro vibrator is bonded to the electrode connection portion defined at the end of the voltage detection wiring disposed on the mounting substrate. The voltage detection wiring is spaced away from the voltage application wiring, which is provided for voltage application to the surface electrode of the micro vibrator. Also, the voltage detection wiring is electrically independent on the voltage application wiring on the mounting substrate. In the mounting structure, therefore, it is possible to detect the voltage of the surface electrode via the voltage detection wiring. That is, when the voltage of the surface electrode is detected, it is not necessary to have a direct contact with the surface electrode of the micro vibrator other than the bonding portion with the mounting substrate. As such, in the mounting structure, it is possible to confirm the bonding reliability between the micro vibrator and the mounting substrate based on the electrical characteristics such as an electrical resistance of a path having the voltage application wiring and the voltage detection wiring, while suppressing damage to the surface electrode and a base material covered by the surface electrode or suppressing a decrease in Q factor.

Embodiments of the present disclosure will be described hereinafter with reference to the drawings. In the following description of the embodiments, the same or equivalent parts are denoted by the same reference numerals.

First Embodiment

A mounting structure 1 of a first embodiment will be described with reference to the drawings. The mounting structure 1 of the present embodiment includes a micro vibrator 2 that vibrates in a wineglass mode, and is applicable to various devices, such as a gryo sensors including BRGs and clock devices, utilizing vibration characteristics of the micro vibrator 2. In this specification, a case in which the mounting structure 1 is applied to a BRG will be described as a representative example. However, the mounting structure 1 is not limited to such an application, and can be applied to other sensors such as inertial sensors different from gyro sensors.

Figure 2:
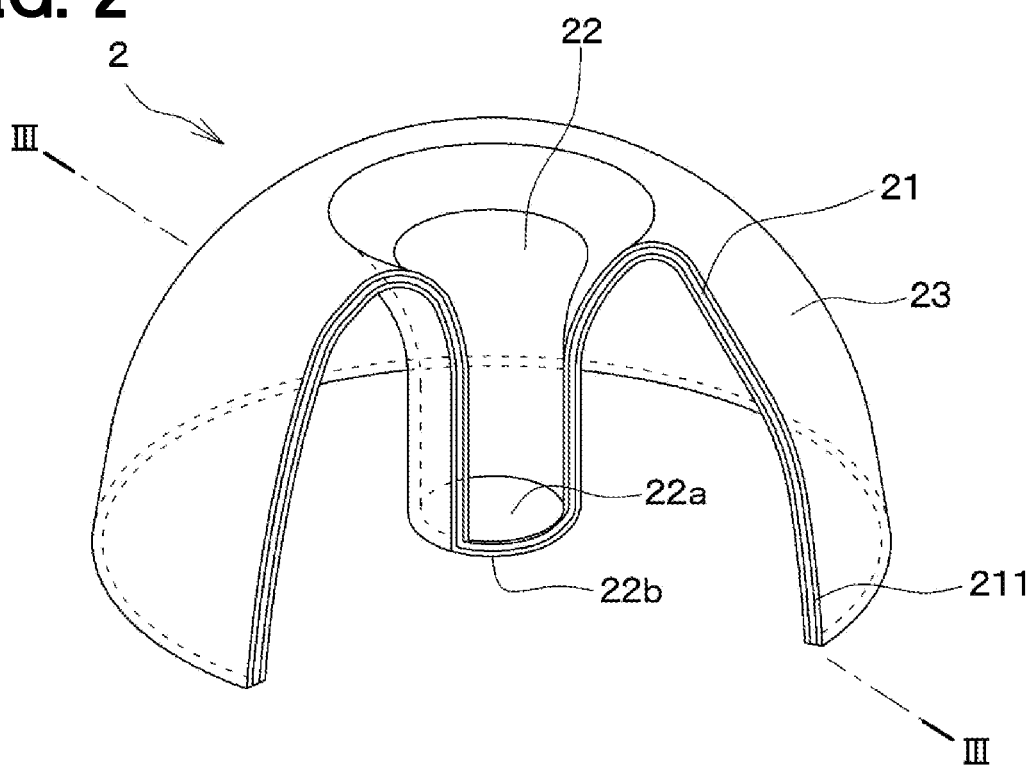
FIG. 2 is a diagram showing a perspective cross-sectional view of a micro vibrator according to the first embodiment.
Figure 10:
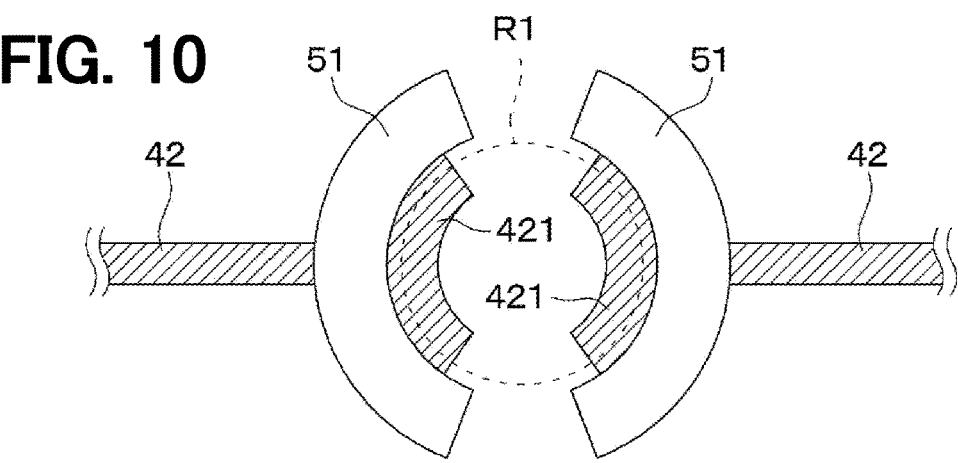
FIG. 10 is a diagram showing a top layout view of an enlarged predetermined area including a facing area of the mounting substrate, for showing another example of a divided inner frame portion and an electrode connection portion.
Figure 11:
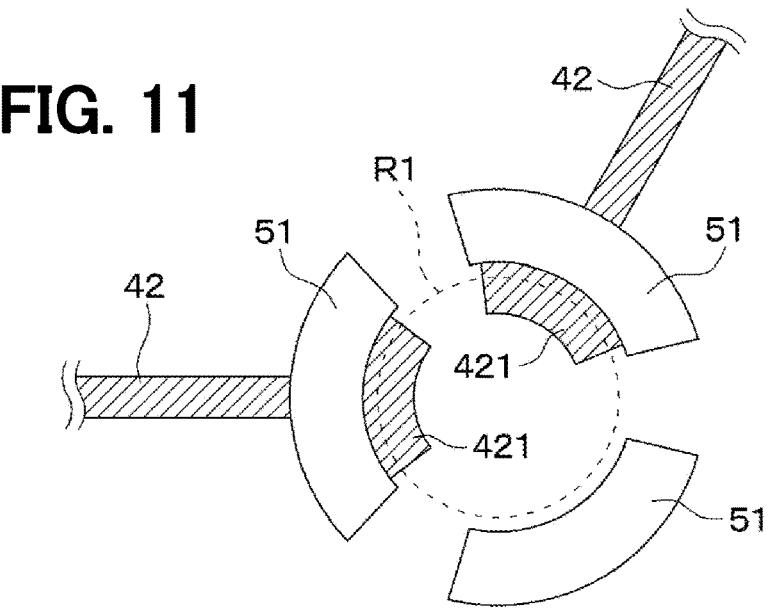
FIG. 11 is a diagram showing a top layout view of a part corresponding to FIG. 10, for showing further another example of a divided inner frame portion and an electrode connection portion.
Figure 12:
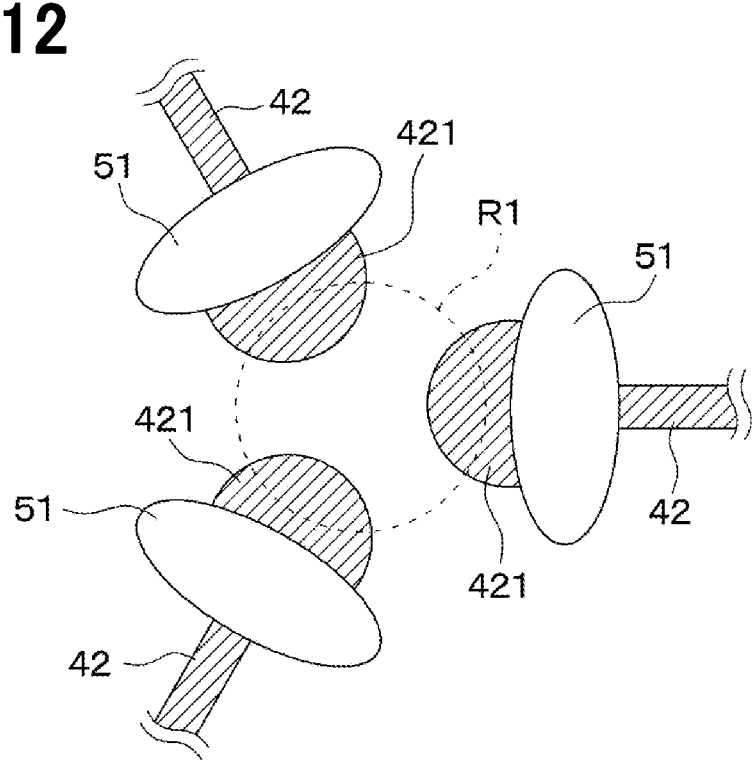
FIG. 12 is a diagram showing a top layout view of a part corresponding to FIG. 10, for showing still another example of a divided inner frame portion and an electrode connection portion.

In FIG. 2, in order to make it easier to understand the structure of the micro vibrator 2, the micro vibrator 2 is shown in cross section while omitting a part, and an outline of a part of the micro vibrator 2, which is not directly viewed in an angle in FIG. 2, is illustrated with a dashed line. In FIGS. 10 to 12, in order to facilitate understanding of other configuration examples of a bridge wiring 42 and a divided inner frame portion 51 of a mounting substrate 3, a predetermined area including the divided inner frame portion 51 is shown, and the other parts of the mounting substrate 3 are omitted. In addition, although FIGS. 10 to 12 are not cross-sectional views, the bridge wiring 42 is shown with hatching.

Hereinafter, for convenience of explanation, as shown in FIG. 1, a direction along a left-right direction in the view is referred to as an "x direction", and a direction orthogonal to the x direction in the view is referred to as a "y direction". Further, a normal direction to an x-y plane including the x direction and the y direction is referred to as a "z direction". The x, y, and z directions in the view of FIG. 3 and subsequent figures correspond to the x, y, and z directions in FIG. 1, respectively. In the present specification, "upper" or "upward" represents a direction along the z direction in the view and represents a direction along the arrow, and "lower" or "downward" represents the opposite direction to the upper or upward. Furthermore, in the present specification, a view in which the mounting structure 1 or the mounting substrate 3 is viewed from the top along the z direction, as shown in FIG. 1, is referred to as a "top view".

A mounting structure 1 of the present embodiment includes a micro vibrator 2 and a mounting substrate 3, for example, as shown in FIG. 1. A part of the micro vibrator 2 is bonded to the mounting substrate 3. The mounting structure 1 detects an angular velocity applied thereto based on a change in capacitance between the micro vibrator 2, which is thin and vibrates in a wineglass mode, and multiple electrode portions 53, which will be described layer, on the mounting substrate 3.

For example, as shown in FIG. 2, the micro vibrator 2 includes a curved surface portion 21 and a connecting portion 22. The curved surface portion 21 has an outline defined by a hemispherical three-dimensional curved surface. The connecting portion 22 extends from a virtual vertex of the hemispherical shape of the curved surface portion 21 toward the center of the hemisphere. The connecting portion 22 has a bottomed tubular shape and defining a recess, for example. In the micro vibrator 2, for example, the curved surface portion 21 has a bowl-shaped three-dimensional curved surface. The micro vibrator 2 exhibits a Q factor of vibration that is $10^5$ or more.

An end of the curved surface portion 21 on a side opposite to the connecting portion 22 is referred to as a rim 211. The rim 211 has, for example, a substantially tubular shape. The micro vibrator 2 is mounted on the mounting substrate 3 in such a manner that a front surface 2a of the rim 211 faces multiple electrode portions 53 of the mounting substrate 3, which will be described later, and the distances from the multiple electrode portions 53 are even. In the mounting structure 1, the micro vibrator 2 is a part in which the curved surface portion 21 including the rim 211 is in a hollow state or in midair without contacting other members, when mounted on the mounting substrate 3. The micro vibrator 2 has a structure in which the rim 211 in the midair state vibrates in a wine glass mode, when mounted on the mounting substrate 3.

Figure 3:
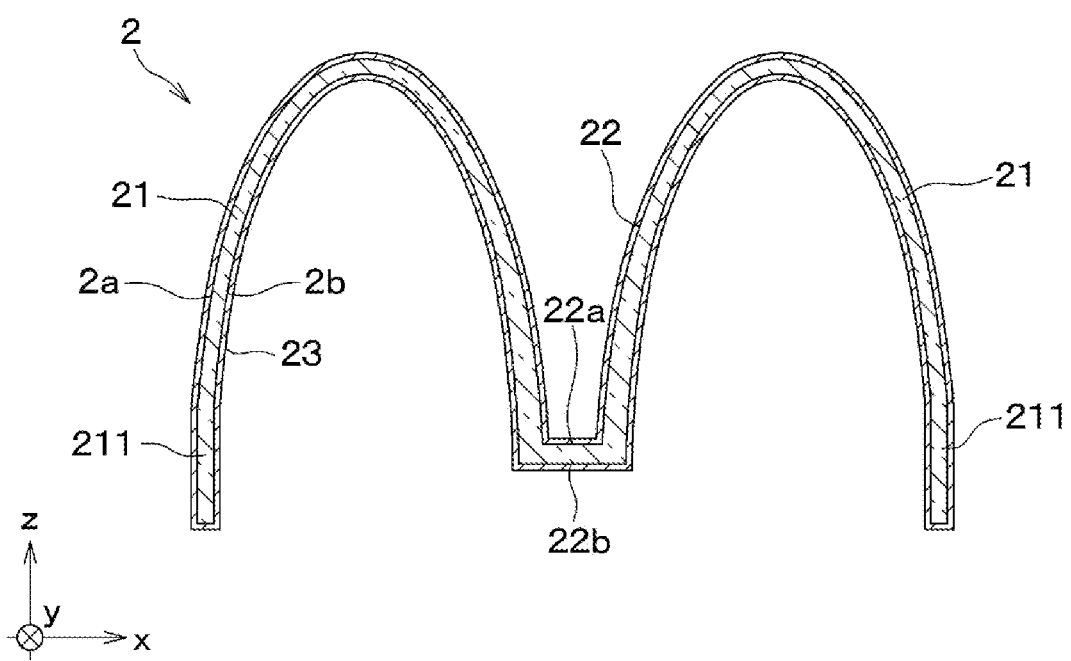
FIG. 3 is a diagram showing a cross-sectional view of the micro vibrator taken along a line III-III in FIG. 2.

The micro vibrator 2 has a front surface 2a and a back surface 2b opposite to the front surface 2a. The front surface 2a may also be referred to as an outer surface 2a. The front surface 2a has a larger diameter than the back surface 2b. As shown in FIGS. 2 and 3, the micro vibrator 2 has a surface electrode 23 that covers a part of or all of the front and back surfaces 2a and 2b, for example. The micro vibrator 2 has a mounting surface 22b on the back surface 2b side of the connecting portion 22. The mounting surface 22b faces the mounting substrate 3. In the present embodiment, for example, a bottom surface of the connecting portion 22 opposite to the mounting surface 22 serves as a suction surface 22a used for suction-conveying the micro vibrator 2.

Although not particularly limited, the surface electrode 23 is, for example, provided by a lamination film including a chromium (Cr) or titanium (Ti) film on a base side and films of any conductive material such as gold (Au) and platinum (Pt), or by a single layer film including a base material such as titanium nitride (TiN) and a film made of a conductive material having an adhesion property with the base material. The surface electrode 23 is formed on the front surface 2a and the back surface 2b of the micro vibrator 2 by any film deposition method such as sputtering, vapor deposition, or atomic layer deposition (ALD). In the present embodiment, the surface electrode 23 is formed on at least the mounting surface 22b and the front surface 2a of the rim 211, and these portions are electrically connected. The surface electrode 23 may have a solid shape that entirely covers the front and back surfaces of the micro vibrator 2, or may be patterned to have the configuration described above so as to partly convers the front and back surfaces 2a and 2b. In the micro vibrator 2, a portion of the surface electrode 23 covering the mounting surface 22b of the connecting portion 22 is connected to electrode connection portions 421 of the mounting substrate 3 via a bonding member 52, which will be described later.

The micro vibrator 2 is made of, for example, quartz, glass containing additives such as borosilicate glass, metallic glass, silicon, ceramics or the like. Note that the material of the micro vibrator 2 is not limited to those materials as long as the micro vibrator 2 is formed to have the curved surface portion 21 with the three-dimensional curved shape and the connecting portion 22, and can vibrate in a wine glass mode. The micro vibrator 2 is a thin member and is formed, for example, by processing a thin base material made of the material described above in a forming process described later, so that the curved surface portion 21 and the connection portion 22 are thin on the order of micrometers, such as in a range from 10 micrometers (μm) to 100 μm. The micro vibrator 2 has a shape in a millimeter-size. A dimension of the micro vibrator 2 in a direction along a thickness direction of the mounting substrate 3, that is, a direction orthogonal to the mounting substrate 3 is referred to as a height. For example, the height of the micro vibrator 2 is 2.5 mm, and the outer diameter of the rim 211 defined by the front surface 2a is 5 mm.

The micro vibrator 2 is formed by, for example, the following process.

Figure 4A:
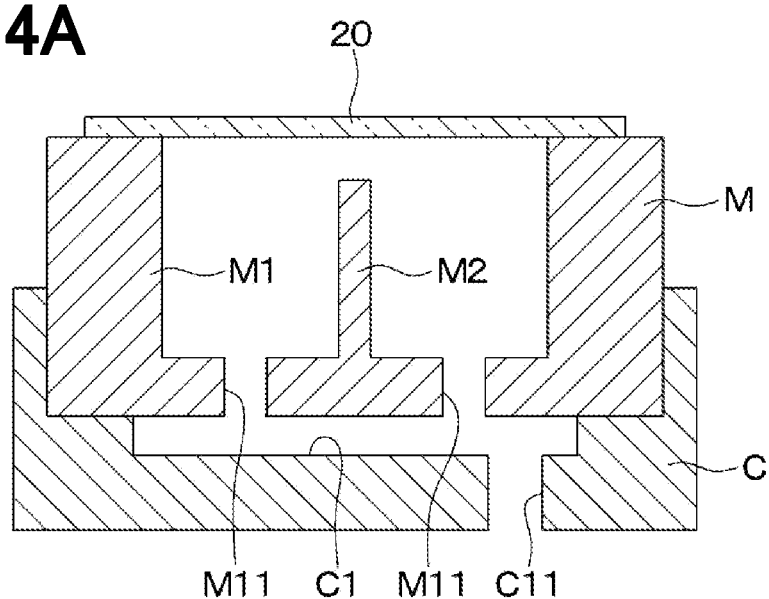
FIG. 4A is a diagram showing a cross-sectional view in a member preparation step of a forming process for forming a micro vibrator having a three dimensional curved surface.

First, for example, as shown in FIG. 4A, a quartz plate 20, a mold M for forming the shape of the three-dimensional curved surface, and a cooling body C for cooling the mold M are prepared. For example, the mold M has a recess portion M1, and a support portion M2. The recess portion M1 defines a space for forming the shape of the three-dimensional curved surface on the quartz plate 20. The support portion M2 is provided at the center of the recess portion M1 and extends along a depth direction of the recess portion M1 and supports a part of the quartz plate 20 during the processing. The mold M has a through hole M11 for pressure reduction in the bottom surface of the recess portion M1. The cooling body C has a fitting portion C1, into which the mold M is fitted, and an exhaust port C11, which is formed at the bottom of the fitting portion C1 and is used for exhaust. The cooling body C is configured to cool the mold M when the quartz plate 20 is processed. The quartz plate 20 is arranged so as to cover an entire area of the recess portion M1 of the mold M.

Figure 4B:
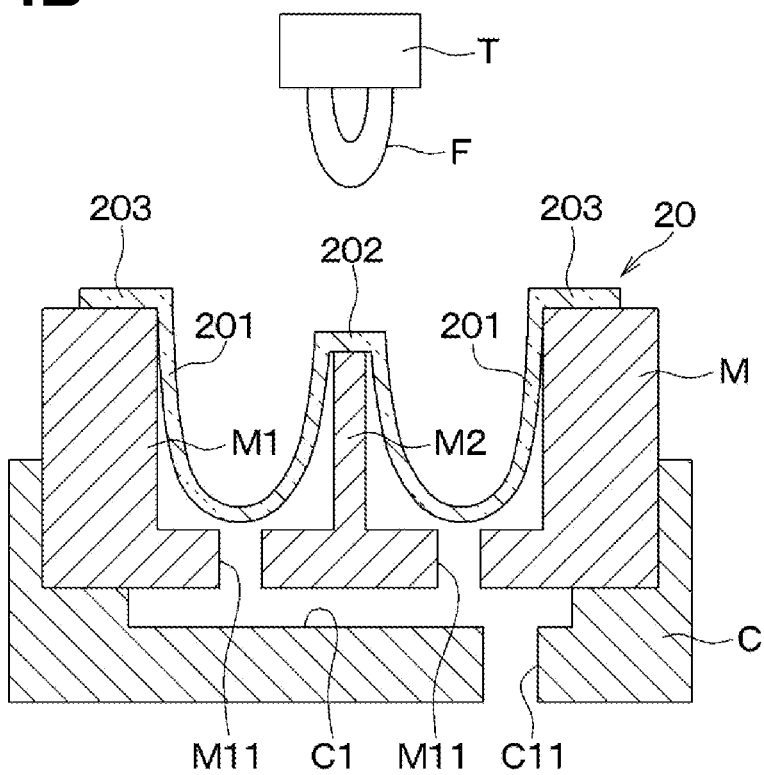
FIG. 4B is a diagram showing a cross-sectional view in the forming process for the micro vibrator subsequent to FIG. 4A.

Then, for example, as shown in FIG. 4B, a flame F is applied from a torch T toward the quartz plate 20 to melt the quartz plate 20. At this time, the recess portion M1 of the mold M is evacuated through the exhaust port C11 of the cooling body C by a vacuum mechanism (not shown). As a result, the melted portion of the quartz plate 20 is stretched toward the bottom surface of the recess portion M1. In addition, a central and peripheral region of the melted portion of the quartz plate 20 is supported by the support portion M2. Thereafter, the heating of the quartz plate 20 is stopped and the quartz plate 20 is cooled. As a result, the quartz plate 20 is formed into a shape including a curved surface portion 201 with a substantially hemispherical three-dimensional curved surface shape and a recessed portion 202 recessing from the central portion of the curved surface portion 201 as being supported by the support portion M2. Further, a portion of the quartz plate 20, which is located on the outside of the recess portion M1, is formed as an end portion 203, which is located at the outer peripheral edge of the curved surface portion 201 and has a flat shape.

Figure 4C:
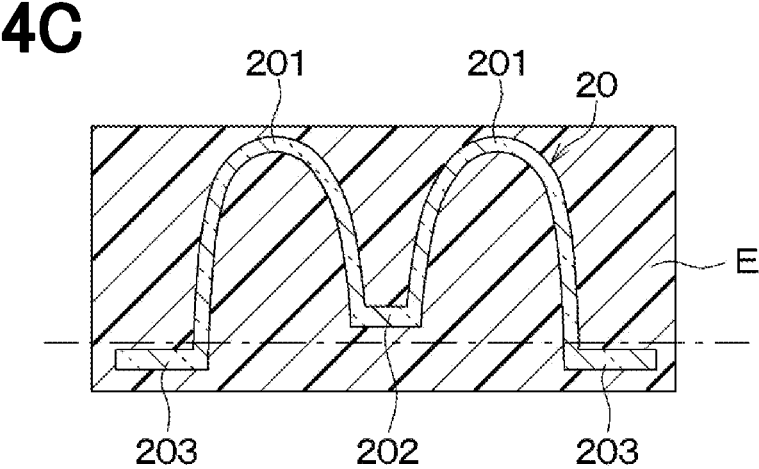
FIG. 4C is a diagram showing a cross-sectional view in the forming process for the micro vibrator subsequent to FIG. 4B.

Subsequently, the recess portion M1 of the mold M is returned to be in a state of normal pressure, and the processed quartz plate 20 is removed from the mold M. As shown in FIG. 4C, the quartz plate 20 is encapsulated with, for example, an encapsulating material E, which is made of any curable resin material. Thereafter, the encapsulating material E is ground and polished by chemical mechanical polishing (CMP) from a surface adjacent to the end portion 203 up to a position indicated by a chain dashed line in FIG. 4C, so the end portion 203 is removed together with the encapsulating material E. As a result, the quartz plate 20 is formed into the shape having the curved surface portion 21 with an annular curved surface and the connecting portion 22 recessed from the top of the curved surface portion 21.

Then, all the encapsulating material E is removed by a method such as heating or melting using a chemical solution, and the quartz plate 20 is taken out. Finally, the surface electrode 23 is formed on both the front and back surfaces of the quartz plate 20 which has been processed as described above by, for example, a film deposition process such as sputtering or vapor deposition. The surface electrode 23 may be patterned by a known method such as using a mask (not shown) or the like, if necessary.

The micro vibrator 2 is produced by, for example, the manufacturing process as described above. However, the manufacturing process of the micro vibrator 2 is not limited to the example described so far. For example, instead of the flame F by the torch T shown in FIG. 4B, the heat source for melting the quartz plate 20 may be provided by a heater that is configured to heat the quartz plate 20 in the same area as when the flame F is used. In this way, the manufacturing process of the micro vibrator 2 may be appropriately changed, and other known methods may be adopted.

The micro vibrator 2 has a substantially half-toroidal shape that is rotationally symmetrical about the Z direction as a rotation axis. However, the shape of the micro vibrator 2 is not limited to the shape of the bird-bath resonator (BR) described above as long as the curved surface portion 21 has a bowl-shaped three-dimensional curved surface shape and is configured to vibrate in the wine glass mode. For example, the connecting portion 22 may have a columnar shape, other than the bottomed tubular shape defining the recess.

Figure 5:
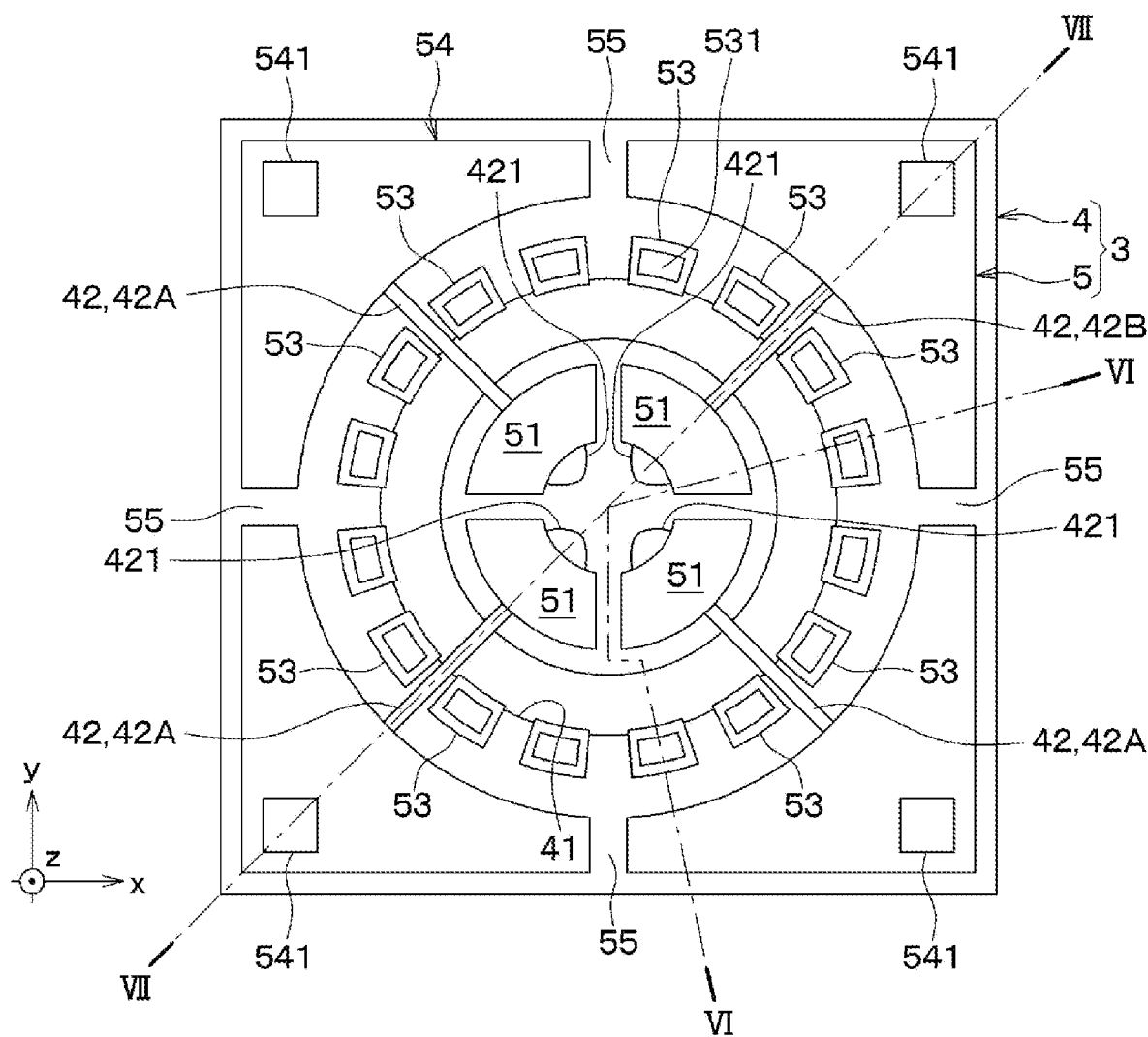
FIG. 5 is a diagram showing a top layout of a mounting substrate according to the first embodiment.

As shown in FIG. 5, for example, the mounting substrate 3 includes a lower substrate 4 and an upper substrate 5, which are bonded to each other. For example, the lower substrate 4 is made of borosilicate glass, which is an insulating material, and the upper substrate 5 is made of silicon (Si), as a semiconductor material. The mounting substrate 3 is, for example, formed by anodically bonding the upper substrate 5 to the lower substrate 4. For example, the mounting substrate 3 includes, in the upper substrate 5, multiple divided inner frame portions 51, multiple electrode portions 53, and multiple divided outer frame portions 54. The electrode portions 53 are arranged apart from each other so as to surround the divided inner frame portions 51. The divided outer frame portions 54 are arranged apart from each other so as to surround the electrode portions 53. For example, the mounting substrate 3 has, in the lower substrate 4, an annular groove 41, and multiple bridge wirings 42. The annular groove 41 surrounds the divided inner frame portions 51 while separating the divided inner frame portions 51 and the electrode portions 53 from each other. The bridge wirings 42 bridge the inner side and the outer side of the groove 41.

Figure 6:
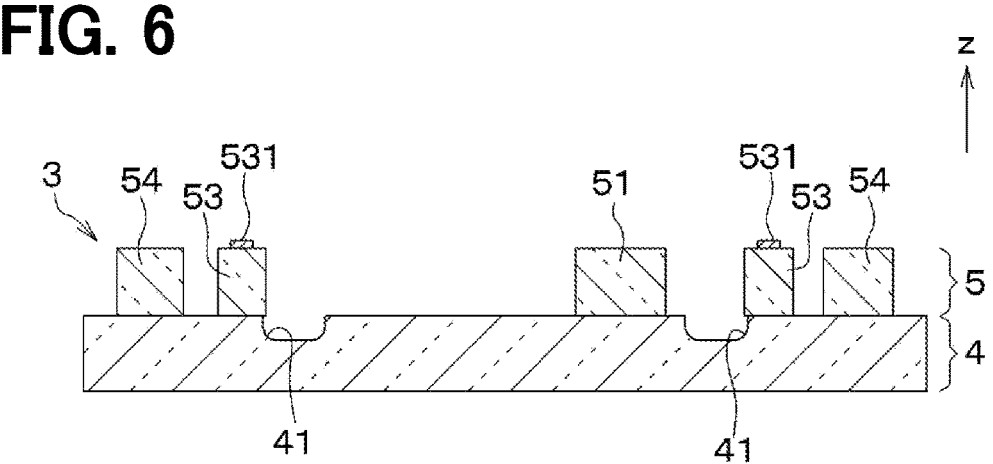
FIG. 6 is a diagram showing a cross-sectional view taken along a line VI-VI in FIG. 5.
Figure 7:
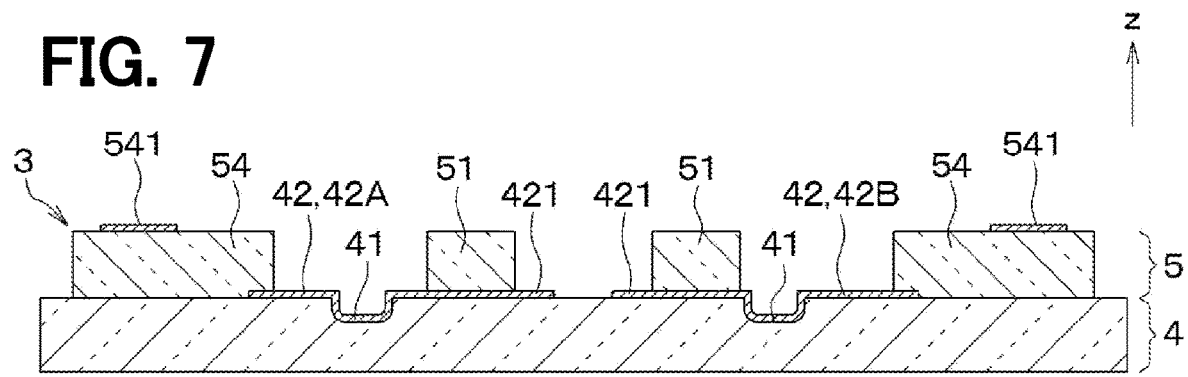
FIG. 7 is a diagram showing a cross-sectional view taken along a line VII-VII in FIG. 5.
Figure 8:
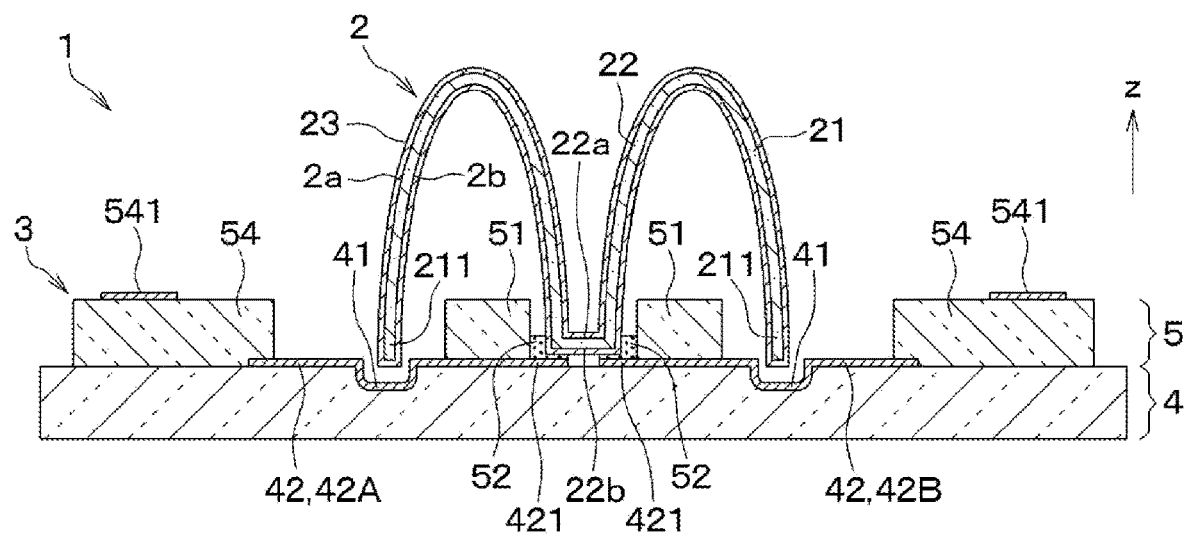
FIG. 8 is a diagram showing a cross-sectional view taken along a line VIII-VIII in FIG. 1.
Figure 9:
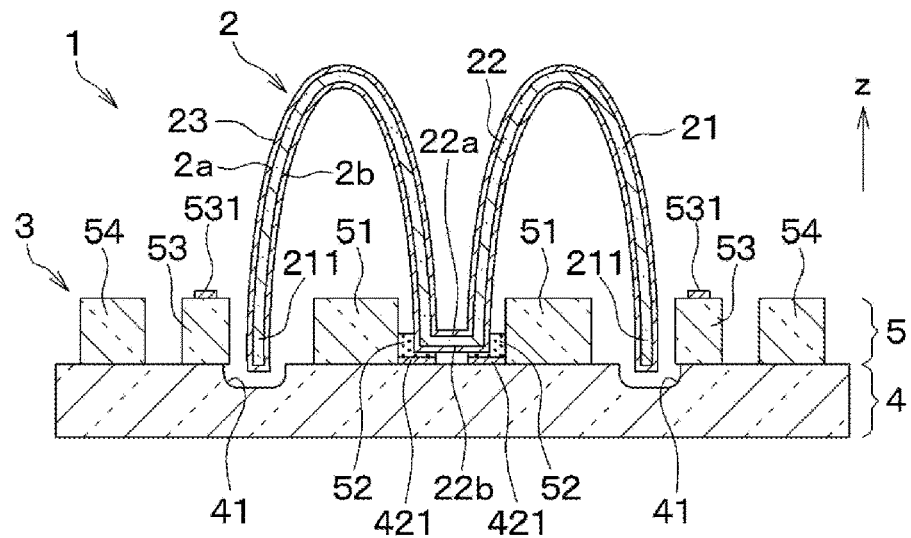
FIG. 9 is a diagram showing a cross-sectional view taken along a line IX-IX in FIG. 1.

For example, as shown in FIGS. 6 and 7, the groove 41 is provided between the divided inner frame portions 51 and the electrode portions 53, and is formed by wet etching or the like. For example, as shown in FIGS. 8 and 9, the groove 41 has a dimension corresponding to the outer diameter of the rim 211 of the micro vibrator 2. The groove 41 is provided so as to avoid contacting of the rim 211 to the mounting substrate 3, when the micro vibrator 2 is mounted on the mounting substrate 3.

The bridge wiring 42 is formed of a conductive material such as aluminum (Al), for example. The bridge wirings 42 are arranged to pass between the electrode portions 53. The bridge wirings 42 are electrically independent of the electrode portions 53. For example, as shown in FIG. 7, the bridge wirings 42 straddle the groove 41 in the lower substrate 4. The bridge wirings 42 each has a first end connected to the divided inner frame portion 51 and a second end connected to the divided outer frame portion 54 so as to electrically connect the divided inner frame portion 51 and the divided outer frame portion 54. For example, the mounting substrate 3 has at least two bridge wirings 42, and the bridge wirings 42 are connected to respectively different divided inner frame portions 51. The mounting substrate 3 defines an inner frame region in a region surrounded by the divided inner frame portions 51. The bridge wiring 42 has an electrode connection portion 421 connected to the surface electrode 23 of the micro vibrator 2 at the first end adjacent to the inner frame region.

The multiple bridge wirings 42 include at least one voltage application wiring 42A for applying voltage to the surface electrode 23 of the micro vibrator 2 and at least one voltage detection wiring 42B for detecting the voltage of the surface electrode 23. The voltage detection wiring 42B is arranged apart from the voltage application wiring 42A on the mounting substrate 3, and is electrically independent of the voltage application wiring 42A before the micro vibrator 2 is connected. In other words, the electrode connection portion 421 of the voltage detection wiring 42B is electrically independent at least from the electrode connection portion 421 of the voltage application wiring 42A. For example, the second end of the bridge wiring 42 opposite to the electrode connection portion 421 is connected to the divided outer frame portion 54 or a terminal (not shown) that can be taken out to the outside. Thus, the bridge wirings 42 enable voltage application to the surface electrode 23 and/or the voltage detection even after the micro vibrator 2 is sealed with a cover material (not shown).

In FIG. 5, the four bridge wirings 42 in total, including three voltage application wirings 42A and one voltage detection wiring 42B, are formed on the mounting substrate 3, and the bridge wirings 42 are respectively, electrically independent of each other. However, FIG. 5 shows an example, and the bride wirings 42 are not limited to the example shown in FIG. 5. The bridge wirings 42 may have at least one voltage application wiring 42A and at least one voltage detection wiring 42B which are electrically independent of each other, and the number, arrangement, or the like of the bridge wirings 42 may be changed as appropriate. Further, when the bridge wirings 42 include two or more voltage application wirings 42A, the voltage application wiring 42A may be electrically independent from another voltage application wiring 42A, or electrically connected to another voltage application wiring 42A. This also applies to the voltage detection wiring 42B.

When viewed from the top, the multiple divided inner frame portions 51 are formed, for example, into an intermittent annular shape as a whole, and are arranged apart from each other. At least two divided inner frame portions 51 are arranged, and, have dimensions so that their inner ends and outer ends do not contact with the micro vibrator 2, as shown in FIGS. 8 and 9. For example, of the multiple divided inner frame portions 51, at least one divided inner frame portion 51 is connected to the voltage application wiring 42A, and at least another one is connected to the voltage detection wiring 42B. The multiple divided inner frame portions 51 may include one that is not connected to the bridge wiring 42.

For example, as shown in FIG. 5, the multiple inner divided inner frame portions 51 have the shape that is formed by equally dividing an annular frame into four. However, the number, arrangement, shape, dimensions and the like of the divided inner frame portions 51 may be changed as appropriate. For example, as shown in FIG. 10, the multiple divided inner frame portions 51 may have the shape that is formed by dividing an annular frame into two, and one of which is connected to the voltage application wiring 42A and the other of which is connected to the voltage detection wiring 42B. For example, as shown in FIG. 11, the multiple divided inner frame portions 51 may have the shape that is formed by dividing an annular frame into three, and one of which is connected to the voltage application wiring 42A, another one of which is connected to the voltage detection wiring 42B and the other one is not connected to the bridge wiring 42. For example, as shown in FIG. 12, the multiple divided inner frame portions 51 may have three divided inner frame portions 51 each having an elliptical shape in the top view and being arranged to as to surround a facing region R1 while spacing apart from each other. The facing region R1 is a region of the mounting substrate 3 facing the connecting portion 22 of the micro vibrator 2.

In addition, in the present embodiment, the electrode connection portions 421 of the multiple bridge wirings 42 are arranged spaced apart from each other and partially located in the facing region R1, as shown in FIGS. 10 to 12, for example. That is, the electrode connection portion 421 may have a shape along the inner contour of the divided inner frame portion 51 when viewed from the top, or may have another shape such as a circular shape or an elliptical shape. The shape, arrangement, dimensions, and the like of the electrode connection portions 421 can be appropriately changed according to the divided inner frame portions 51 and the connection portion 22 of the micro vibrator 2.

The multiple electrode portions 53 are arranged apart from each other so as to surround the divided inner frame portions 51 at positions on the outer periphery of the groove 41. For example, as shown in FIG. 5, the electrode portions 53 have arcuate sides on the inner peripheral side and the outer peripheral side when viewed from the top. When the inner peripheral sides of the electrode portions 53 are connected to each other and the outer peripheral sides of the electrode portions 53 are connected to each other, intermittent circles with different diameters are drawn. In other words, the multiple electrode portions 53 have the shape that is configured by equally dividing an annular ring surrounding the divided inner frame portions 51 at predetermined intervals.

As shown in FIG. 6, for example, each of the multiple electrode portions 53 has an electrode film 531 on an upper surface thereof. For example, wires (not shown) are connected to the electrode films 531 on the electrode portions 53, so that the multiple electrode portions 53 are electrically connected to an external circuit board (not shown) to enable potential control. As shown in FIGS. 1 and 8, for example, when the micro vibrator 2 is mounted, the multiple electrode portions 53 are in a state of being separated from the rim 211 of the micro vibrator 2 by a predetermined distance, and each of the multiple electrode portions 53 forms a capacitor with the micro vibrator 2. That is, the mounting substrate 3 is configured to detect the capacitance with the micro vibrator 2 via the multiple electrode portions 53 and to generate an electrostatic attractive force with the micro vibrator 2 to enable the micro vibrator 2 to vibrate in the wine glass mode.

Further, FIG. 1 and some figures show an example in which sixteen electrode portions 53 are arranged on the mounting substrate 3 at equal intervals as to form a ring. However, the present disclosure is not limited to this example. The number and the arrangement of the electrode portions 53 may be appropriately modified according to the shape and the size of the micro vibrator 2.

For example, the divided outer frame portions 54 each have a structure provided by a portion of a frame surrounding the divided inner frame portions 51 and being divided at multiple grooves 55, when viewed from the top. Also, as shown in FIGS. 5 and 7, the divided outer frame portion 54 has an electrode film 541 made of Al or the like on an upper surface thereof. For example, the multiple divided outer frame portions 54 are electrically connected to different divided inner frame portions 51 via different bridge wirings 42, respectively, and wires (not shown) are connected to the electrode films 541. As a result, the multiple divided outer frame portions 54 are electrically connected to an external circuit board or the like (not shown), so as to enable the potential control and the voltage detection of the surface electrode 23 of the micro vibrator 2 via the divided outer frame portions 54 using an outer power supply or the like (not shown).

Note that the divided outer frame portion 54 connected to the voltage detection wiring 42B is electrically independent of at least the divided outer frame portion 54 connected to the voltage application wiring 42A. Further, the divided outer frame portions 54 are not limited to the example in which four divided outer frame portions 54 are formed as shown in FIG. 5. The number, arrangement, shape, dimensions and the like of the divided outer frame portions 54 may be changed appropriately depending on the number or the like of the bridge wirings 42.

The bonding member 52 is made of a conductive material. The bonding member 52 is used for bonding the micro vibrator 2 and the mounting substrate 3, and electrically connects the electrode connection portions 421 of the bridge wirings 42 and the surface electrode 23 of the micro vibrator 2. The bonding member 52 is, for example, a paste-like conductive material containing a conductive material such as gold tin (AuSn), silver (Ag), or gold (Au), and is applied to the electrode connection portion 421 using a syringe or the like. The bonding member 52 is arranged on each of the electrode connection portions 421 of the mounting substrate 3. For example, as shown in FIG. 8, the bonding member 52 is arranged so as not to straddle the electrode connection portion 421 of the voltage detection wiring 42B and the electrode connection portion 421 of the voltage application wiring 42A. This is to prevent the application voltage of the surface electrode 23 and the application voltage of the voltage application wiring 42A from being merged due to the voltage detection wiring 42B being directly connected to the voltage application wiring 42A through the bonding member 52.

Figure 13:
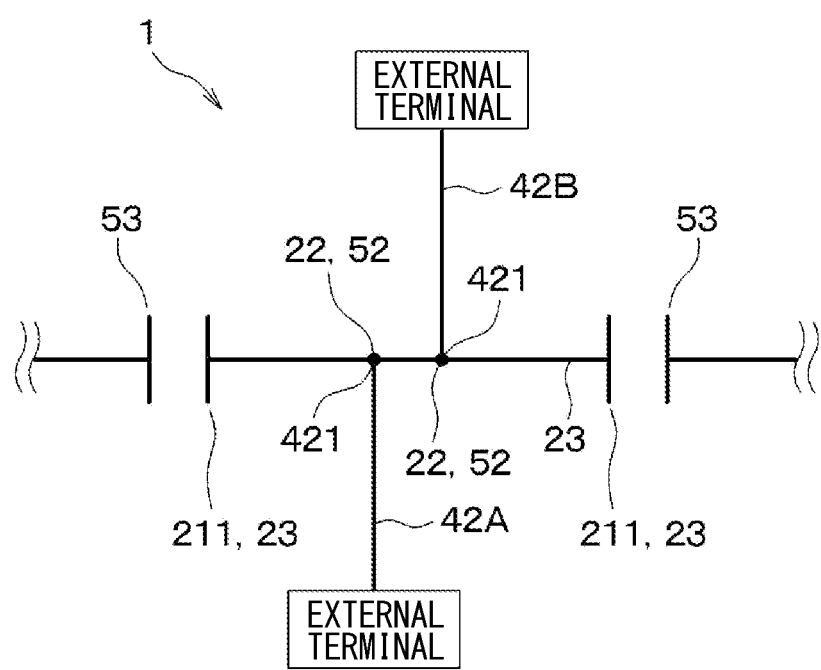
FIG. 13 is an explanatory diagram for explaining electrical connection between a surface electrode and a bridge wiring in the mounting structure according to the first embodiment.

That is, in the mounting structure 1, for example, as shown in FIG. 13, the voltage application wiring 42A and the voltage detection wiring 42B are connected to different positions of the surface electrode 23 of the micro vibrator 2, but the voltage application wiring 42A and the voltage detection wiring 42B are electrically connected via the surface electrode 23 without being directly connected to each other. The voltage application wiring 42A and the voltage detection wiring 42B are connected to external terminals, respectively, so that the voltage application and the voltage detection can be performed from the outside without contacting any portions of the surface electrodes 23 other than the bonding portion with the mounting substrate 3. Moreover, even when the micro vibrator 2 is enclosed with a cover member (not shown), the voltage application wiring 42A and the voltage detection wiring 42B are connected to the external terminals, so the voltage application to the surface electrode 23 and the voltage detection of the surface electrode 23 are possible. The multiple electrode portions 53 of the mounting substrate 3 include drive electrodes for driving the micro vibrator 2 in the wine glass mode and detection electrodes for detecting the capacitance. The multiple electrode portions 53 are connected to external terminals via wires (not shown) and opposed to portions of the surface electrode 23 covering the rim 211. In FIG. 13, an example in which one voltage application wiring 42A and one voltage detection wiring 42B are connected to the surface electrode 23 is shown for the sake of clarity. However, the present disclosure is not limited to this example, and the mounting structure 1 may have at least one voltage application wirings 42A and at least one voltage detection wiring 42B.

The mounting substrate 3 may be produced by, for example, the following process.

First, the lower substrate 4 made of, for example, borosilicate glass is prepared, and the annular groove 41 is formed on the lower substrate 4 by wet etching using buffered hydrofluoric acid. Then, the bridge wirings 42 are formed, for example, by a lift-off method using film formation by Al sputtering. The bridge wirings 42 are formed to bridge over the groove 41 and have the electrode connection portions 421 at positions more to inside from a formation area where the divided inner frame portions 51 are to be formed. The thickness of the bridge wiring 42 is, for example, about 0.1 micrometers (μm).

Subsequently, for example, a Si substrate made of Si (later the upper substrate 5) is prepared and is anodically bonded to the lower substrate 4 of the borosilicate glass. Next, grooves are formed in the Si substrate by a known etching method so as to define regions that will later become the multiple divided inner frame portions 51, the multiple electrode portions 53, and the multiple divided outer frame portions 54.

Specifically, trench etching is performed, for example, by deep reactive ion etching (DRIE) to partially expose the lower substrate 4, and the multiple divided inner frame portions 51, the multiple electrode portions 53, and the multiple divided outer frame portions 54 are divided from each other. As a result, the Si substrate becomes the upper substrate 5 having the multiple divided inner frame portions 51, the multiple electrode portions 53, and the multiple divided outer frame portions 54, which are separated from each other. Further, the groove 41 formed in the lower substrate 4 is exposed from the upper substrate 5 by this dividing process of the Si substrate.

Finally, for example, the electrode films 531 and 541 are formed on the upper surfaces of the multiple electrode portions 53 and divided outer frame portions 54 by sputtering or the like. As a result of these processes, the mounting substrate 3 having the configurations described above is obtained. When the micro vibrator 2 is placed on the mounting substrate 3, the bonding member 52 is arranged on the electrode connection portions 421 of the lower substrate 4.

The one mounting substrate 3 shown in FIG. 5 or the like can be obtained, for example, by forming regions to be the multiple mounting substrates 3 each having the configurations described above on a wafer and separating the multiple mounting substrates 3 into pieces by dicing cut or the like. In other words, the mounting substrate 3 can be manufactured at a wafer level.

The mounting substrate 3 produced by the processes described above is suctioned and fixed to a mounter device (not shown), and the micro vibrator 2 is transferred by a transfer device (not shown), so that the mounting surface 22b of the connecting portion 22 is brought into contact with the bonding member 52. Further, the bonding member 52 is solidified. Thus, the micro vibrator 2 is mounted on the mounting substrate 3. For example, the micro vibrator 2 can be transferred by bringing a gripping mechanism (not shown) of the transfer device capable of vacuum adsorption into contact with the suction surface 22a of the micro vibrator 2 and carrying out vacuum adsorption. Then, the mounting substrate 3 is heated by a heating mechanism (not shown) of the mounter device, and the micro vibrator 2 is placed on the mounting substrate 3 and is cooled to solidify the bonding member 52. In this way, the micro vibrator 2 is bonded to the mounting substrate 3.

The alignment of the micro vibrator 2 with respect to the mounting substrate 3 may be performed in such a manner that the micro vibrator 2 and the mounting substrate 3 are imaged, feature points are extracted by edge detection using a known image processing technique, and the relative positions are adjusted.

The basic configurations of the mounting structure 1 of the micro vibrator 2 are described hereinabove. When the mounting structure 1 constitutes a BRG, the micro vibrator 2 is vibrated in a wine glass mode by generating an electrostatic attraction between some of the multiple electrode portions 53 and the micro vibrator 2 during driving. In this BRG, when a Coriolis force is applied from the outside while the micro vibrator 2 is in a vibrating state, the micro vibrator 2 is displaced and the position of the node in the vibration mode changes. The BRG detects changes in the nodes of this vibration mode based on the electrostatic capacitances between the micro vibrator 2 and the multiple electrode portions 53, thereby to detect the angular velocity applied thereto.

In the present embodiment, the surface electrode 23 of the micro vibrator 2 is connected to the voltage application wiring 42A and the voltage detection wiring 42B, which are formed on the mounting substrate 3 and electrically independent of each other, as the bridging wirings 42. Thus, the mounting structure 1 is electrically connectable to an external device through these bridge wirings 42. Therefore, after the micro vibrator 2 is connected to the mounting substrate 3, the voltage of the surface electrode 23 of the micro vibrator 2 can be detected via the voltage detection wiring 42B. As a result, in detecting the voltage of the surface electrode 23, there is no need to directly apply the probe to a portion of the surface electrode 23 other than the bonding portion with the mounting substrate 3. In the mounting structure 1, therefore, damage to the base material of the micro vibrator 2 and the surface electrode 23 can be suppressed, as well as the degradation of the Q factor due to the damage can be suppressed. In addition, in the BRG having this mounting structure 1, the inspection process of inspecting the voltage applied to the surface electrode 23 is simplified, and it is possible to detect failures due to the bonding state between the micro vibrator 2 and the mounting substrate 3. Therefore, it is possible to improve the yield, and to achieve the effects of improving reliability and reducing manufacturing costs.

Modification of First Embodiment

Figure 14:
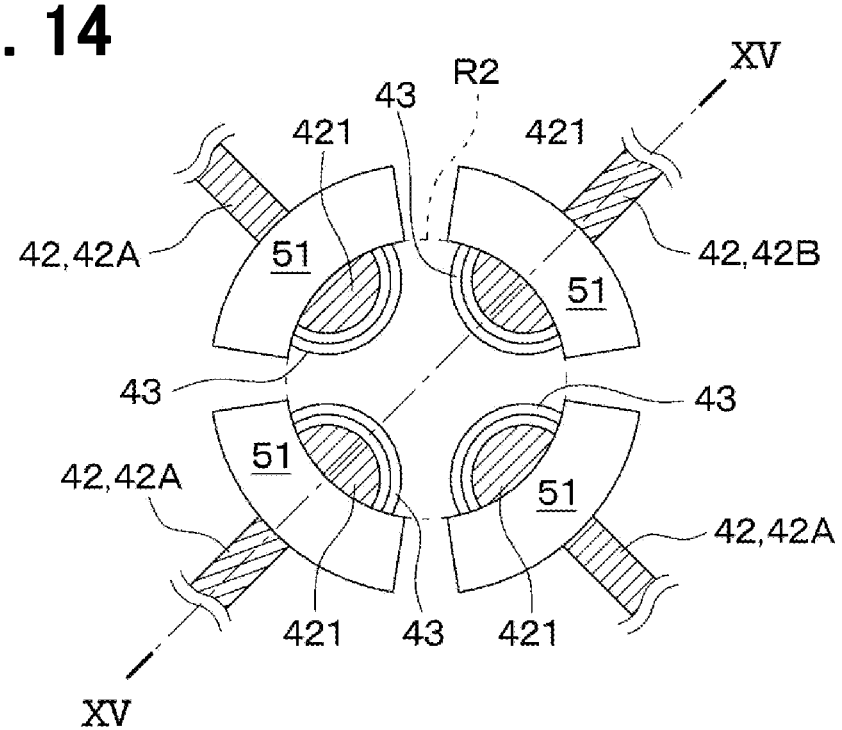
FIG. 14 is a diagram showing a top layout view, corresponding to FIG. 10, for showing a modification of the mounting substrate according to the first embodiment.

For example, as shown in FIG. 14, the mounting substrate 3 may have multiple separation grooves 43 that separate the electrode connection portions 421 in an inner frame region R2 surrounded by the multiple divided inner frame portions 51.

In FIG. 14, similar to FIG. 10, a predetermined region including the divided inner frame portions 51 is shown but the other components of the mounting substrate 3 are omitted, in order to make the configurations of the bridge wirings 42 and the divided inner frame portions 51 of the mounted substrate 3 easy to understand. Although FIG. 14 does not show a cross section view, the bridge wiring 42 is hatched. These also apply to FIGS. 20 and 23, which will be described later.

Figure 15:
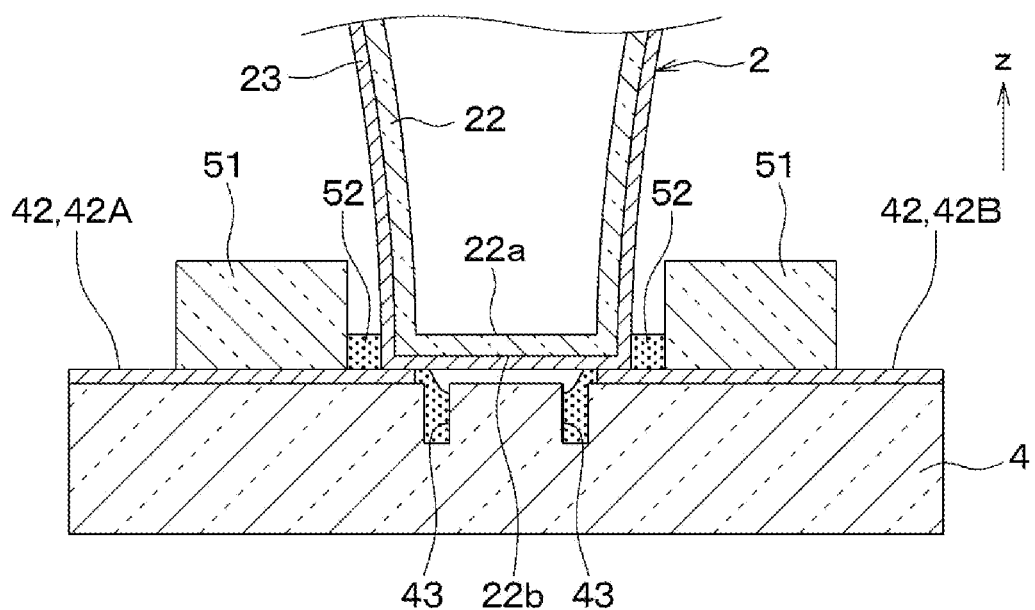
FIG. 15 is a diagram showing a cross-section taken along a line XV-XV in FIG. 14, in a state where a micro vibrator is bonded to the mounting substrate shown of FIG. 14.

The separation grooves 43 are respectively formed in the vicinity of respective electrode connection portions 421 so as to allow the surplus portion of the bonding member 52 for bonding the micro vibrator 2 and the electrode connection portion 421 of the mounting substrate 3 to flow therein, when the bonding member 52 wets and spreads. For example, the multiple separation grooves 43 are formed with the same number as the electrode connection portions 421 and are arranged spaced apart from each other so as to be independent on each other. For example, as shown in FIG. 15, the separation grooves 43 allow the surplus portions of the bonding members 52 arranged on the respective electrode connection portions 421 to flow into the separation grooves 43, thereby to restrict the different electrode connection portions 421 from being directly electrically connected through the bonding member 52. As a result, it is possible to more properly restrict the voltage application wiring 42A and the voltage detection wiring 42B from being directly connected. Further, the voltage detection of the surface electrode 23 of the micro vibrator 2 can be stably performed. Note that a portion of the mounting surface 22b of the micro vibrator 2 is in contact with a portion of the inner frame region R2 of the mounting substrate 3, and thus the mounting surface 22b of the micro vibrator 2 serves as an abutting portion that is in contact with and abuts on the mounting substrate 3.

The multiple separation grooves 43 may be configured so that at least one formed in the vicinity of the voltage application wiring 42A and one formed in the vicinity of the voltage detection wiring 42B are separated from each other. The number, arrangement, shape, dimensions such as width and depth or the like of the multiple separation grooves 43 may be changed as appropriate. Further, the multiple separation grooves 43 may be formed by wet etching or the like in the same process as the groove 41, or in a different process from the groove 41.

Also in this modification, the mounting structure 1 can achieve the similar effects to those of the first embodiment. In addition, since the mounting substrate 3 has the multiple separation grooves 43, it is possible to more reliably restrict the voltage application wiring 42A and the voltage detection wiring 42B from being directly connected to each other due to the flowing or goring around of the bonding members 52, which results in poor insulation.

Second Embodiment

A mounting structure 1 according to a second embodiment will be described with reference to the drawings.

Figure 16:
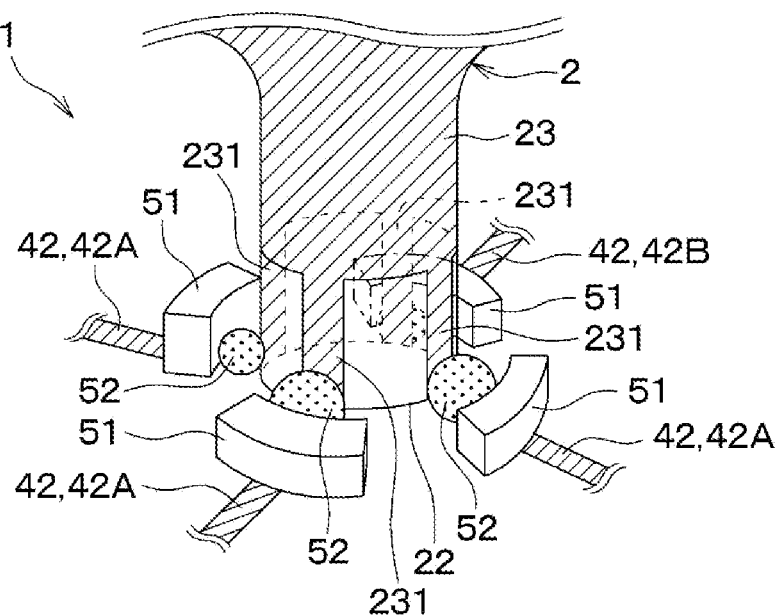
FIG. 16 is a diagram showing a perspective view of a bonding portion between a micro vibrator and a mounting substrate in a mounting structure according to a second embodiment.
Figure 18:
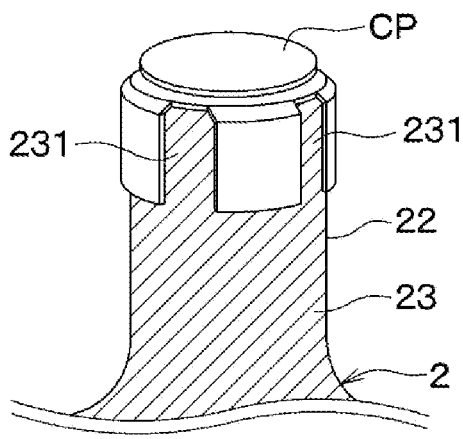
FIG. 18 is a diagram showing a perspective view of a cap mask used when forming a pattern-shaped surface electrode shown in FIG. 17.
Figure 19:
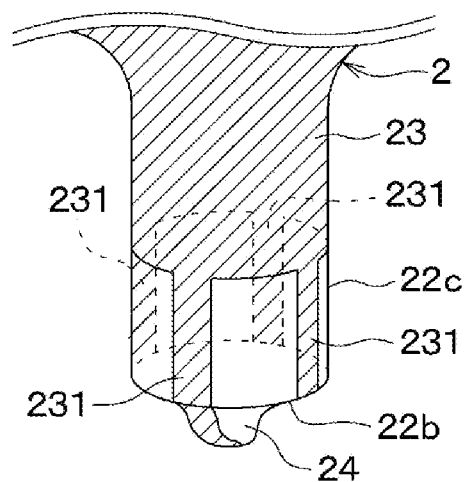
FIG. 19 is a diagram showing a perspective view of a connecting portion of a micro vibrator according to a modification of the second embodiment.
Figure 20:
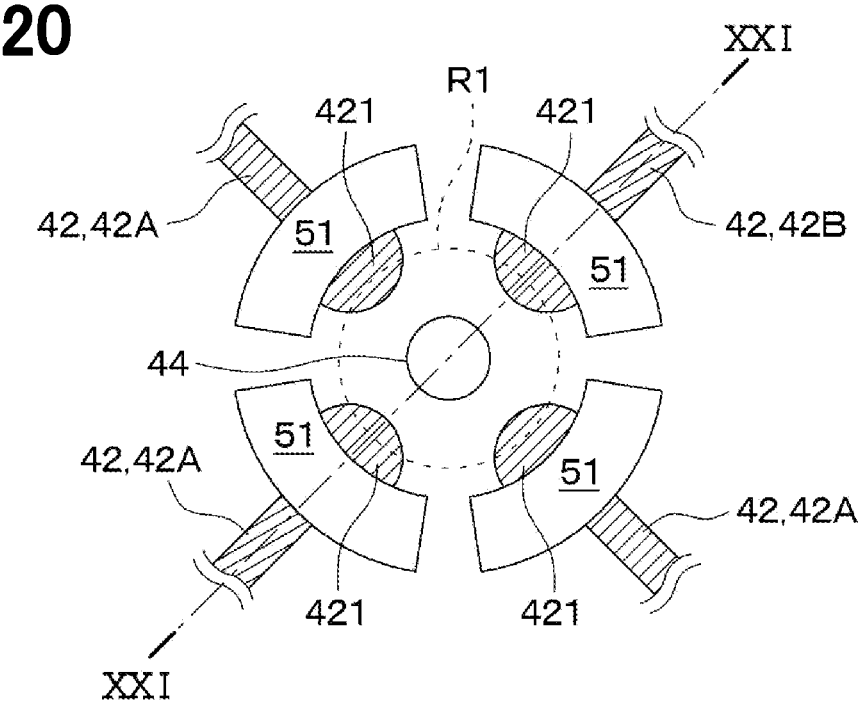
FIG. 20 is a diagram showing a top layout view, corresponding to FIG. 10, for showing a configuration of a part of the mounting substrate according to the modification of the second embodiment.

In FIGS. 16 and 20, only a predetermined region of the mounting substrate 3 including the divided inner frame portions 51 are shown, and other portions of the mounting substrate 3 are not shown in order to facilitate understanding of the state of bonding between the micro vibrator 2 and the mounting substrate 3. In FIGS. 16 to 19 and 21, only a partial configuration of the micro vibrator 2 on the mounting surface 22b side of the connecting portion 22 is shown, and other parts of the micro vibrator 2 are not shown for the sake of clarity. Although FIGS. 16 to 19 do not show cross-sectional views, the surface electrode 23 is hatched and an outline of a part that cannot be viewed from the angle shown in the figure is shown with a dashed line in order to make the pattern shape of the surface electrode 23 easier to understand.

In the mounting structure 1 of the present embodiment, for example, as shown in FIG. 16, the surface electrode 23 of the micro vibrator 2 includes multiple branched electrodes 231 at positions covering the side wall surface of the connecting portion 22. In the mounting structure 1, the multiple branched electrodes 231 of the micro vibrator 2 are connected to different divided inner frame portions 51 of the mounting substrate 3 through the bonding members 52. This mounting structure 1 differs from the mounting structure 1 of the first embodiment on the point described above. Hereinafter, the difference from the first embodiment will be mainly described.

In the micro vibrator 2 of the present embodiment, the mounting surface 22b of the connecting portion 22 is exposed from the surface electrode 23, and the multiple branched electrodes 231 of the surface electrode 23 are bonded to the mounting substrate 3 by the bonding members 52. In the micro vibrator 2, the multiple branched electrodes 231 are connected to the electrode connection portions 421 of the different bridge wirings 42 by the bonding members 52, respectively. In the micro vibrator 2 of the present embodiment, a portion of the side wall surface 22c on the back surface 2b side of the connecting portion 22 (hereinafter simply referred to as the "side wall surface 22c") interposed between adjacent branched electrodes 231 is exposed from the surface electrode 23. As a result, the mounting structure 1 of the present embodiment has an electrical connection structure similar to that of the first embodiment shown in FIG. 13.

Figure 17:
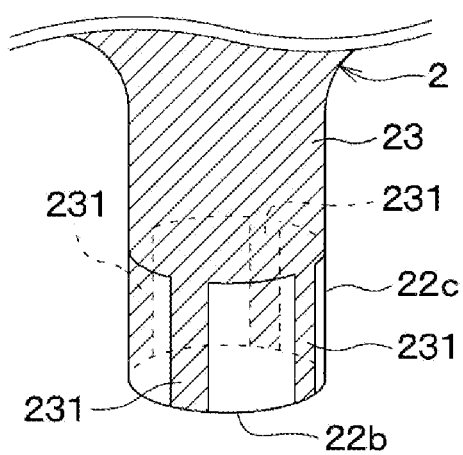
FIG. 17 is a diagram showing a perspective view of a connecting portion of the micro vibrator according to the second embodiment.

In the present embodiment, for example, as shown in FIG. 17, the surface electrode 23 has the branched electrodes 231 at positions close the lower end of the side wall surface 22c on the mounting surface 22b side and corresponding to the multiple divided inner frame portions 51 of the mounting substrate 3. In other words, the surface electrode 23 has the branched electrodes 231 with the same number as the divided inner frame portions 51 to which the bridge wirings 42 are connected, for example.

For example, as shown in FIG. 16, the width of the branched electrode 231 is made smaller than the width of the divided inner frame portion 51 so that it is not directly connected to another adjacent branched electrode 231 via the bonding member 52. For example, as shown in FIG. 18, the branched electrodes 231 are produced by forming the surface electrode 23 by a vacuum deposition method such as a sputtering in a state where a cap mask CP is attached to the mounting surface 22b of the connecting portion 22. The cap mask CP is made of any material such as metal or resin.

Also in the present embodiment, the mounting structure 1 achieving the similar effects as those of the first embodiment can be obtained.

Modification of Second Embodiment

For example, as shown in FIG. 19, the mounting structure 1 may have a bottom protrusion 24 on the mounting surface 22b for positioning the micro vibrator 2 with respect to the mounting substrate 3. In this case, for example, as shown in FIG. 20, the mounting substrate 3 has a fitting recess 44 in the facing region R1 to receive the bottom protrusion 24 of the micro vibrator 2.

To form the bottom protrusion 24 of the micro vibrator 2, for example, the mold M of FIG. 4A in which the support portion M2 additionally has a protrusion at an end surface is prepared, and the similar process to that performed in the first embodiment is performed. For example, as shown in FIG. 19, one of the branched electrodes 231 is extended onto the surface of the bottom protrusion 24. However, the configuration is not limited to this example, and the bottom protrusion 24 maybe exposed from the surface electrode 23. The configuration of the bottom protrusion 24 having one surface electrode 231 extended thereon as described above can be produced by using a cap mask CP having a groove connecting a portion of the bottom protrusion 24 and a portion of a formation area where the branched electrode 231 is to be formed on the side wall surface 22c of the connecting portion 22.

Figure 21:
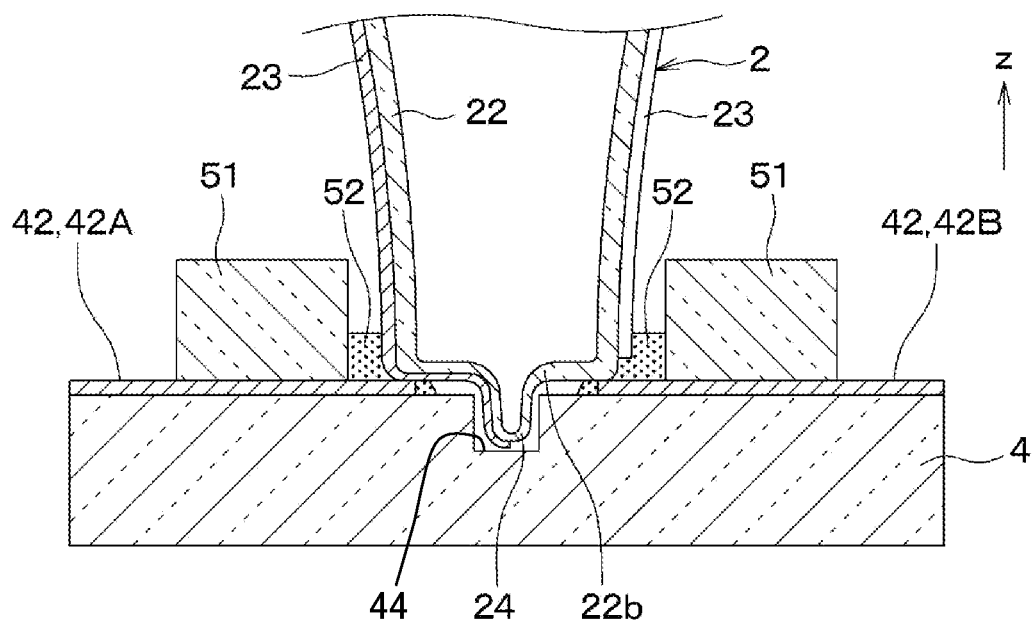
FIG. 21 is a diagram showing a bonding portion between a micro vibrator and a mounting substrate in a mounting structure according to a modification of the second embodiment, and is a cross-sectional view taken along a line XXI-XXI in FIG. 20.
Figure 22:
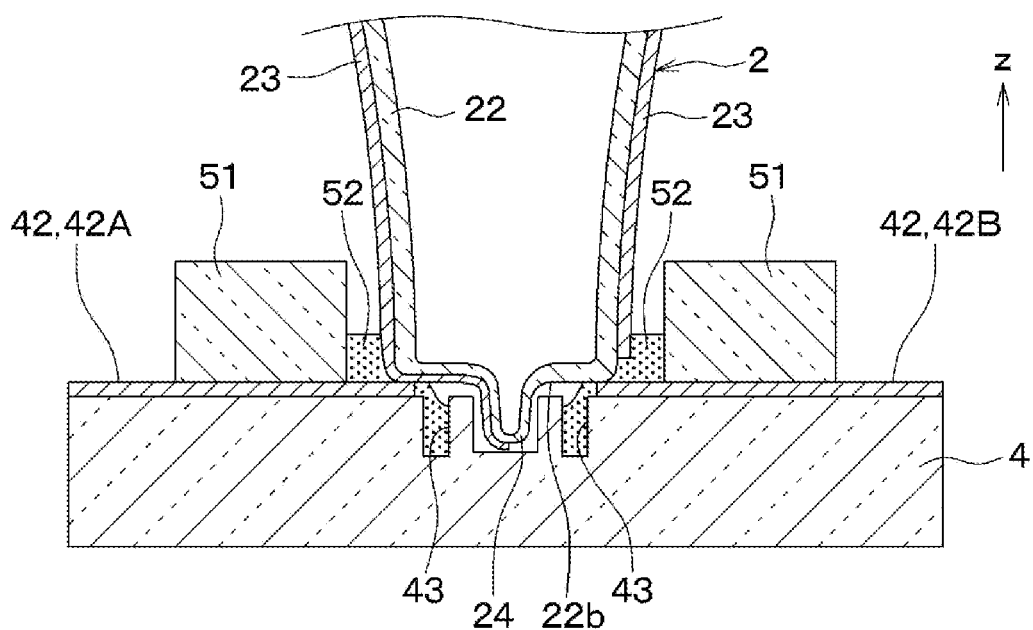
FIG. 22 is a diagram showing a mounting structure, corresponding to FIG. 21, according to another modification of the second embodiment.

For example, as shown in FIG. 21, the fitting recess 44 has an inner diameter approximately the same as the outer diameter of the bottom protrusion 24 so that the bottom protrusion 24 can be fitted in the fitting recess 44 when the micro vibrator 2 is mounted on the mounting substrate 3. Also, the fitting recess 44 has the depth that is at least equal to or greater than the height of the bottom protrusion 24. For example, the fitting recess 44 is formed by wet etching or the like, similar to the groove 41. For example, as shown in FIG. 22, the mounting substrate 3 may have multiple separation grooves 43, in addition to the fitting recess 44. The separation grooves 43 separate the fitting recess 44 from the electrode connection portions 421. In the micro vibrator 2, a portion of the mounting surface 22b on a periphery of the bottom protrusion 24 serves as an abutting portion that abuts on the portion of the inner frame region R2 of the mounting substrate 3 on the outer periphery of the fitting recess 44 or on the outer side of the separation grooves 43.

Also in this modification, the mounting structure 1 that can achieve the similar effects to those of the second embodiment described above can be obtained. Further, according to this modification, since the micro vibrator 2 and the mounting substrate 3 have the bottom protrusion 24 and the fitting recess 44, respectively, the micro vibrator 2 and the mounting substrate 3 can be easily positioned, and the yield is further improved. Thus, the mounting structure 1 with higher connection reliability can be obtained. Furthermore, when the mounting substrate 3 has the multiple separation grooves 43, the similar effects to those of the modification of the first embodiment can be achieved.

Third Embodiment

A mounting structure 1 of a third embodiment will be described with reference to the drawings.

Figure 23:
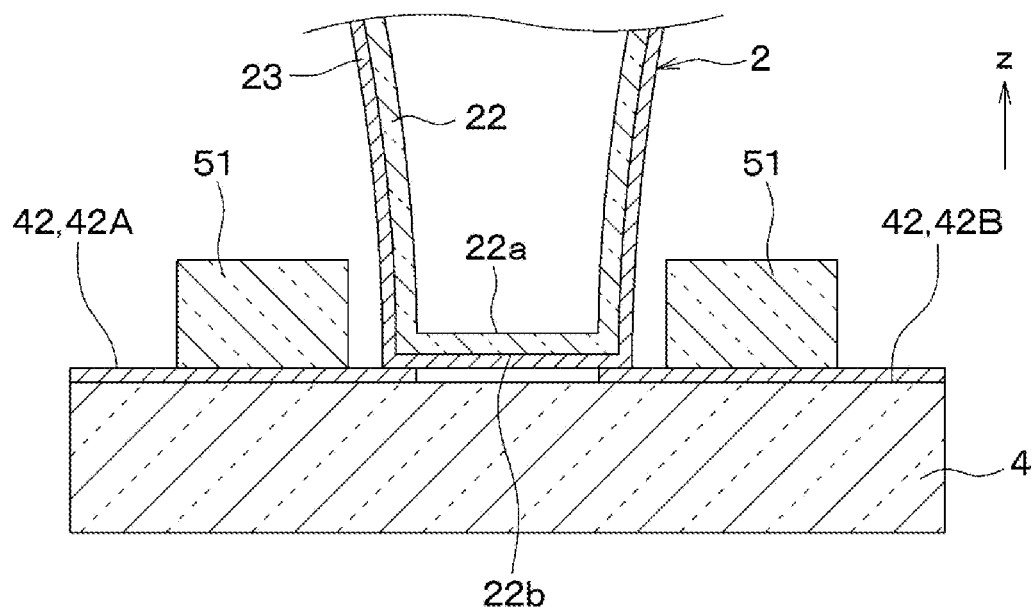
FIG. 23 is a diagram showing a cross-sectional view of a bonding portion between a micro vibrator and a mounting substrate in a mounting structure according to a third embodiment.
Figure 24:
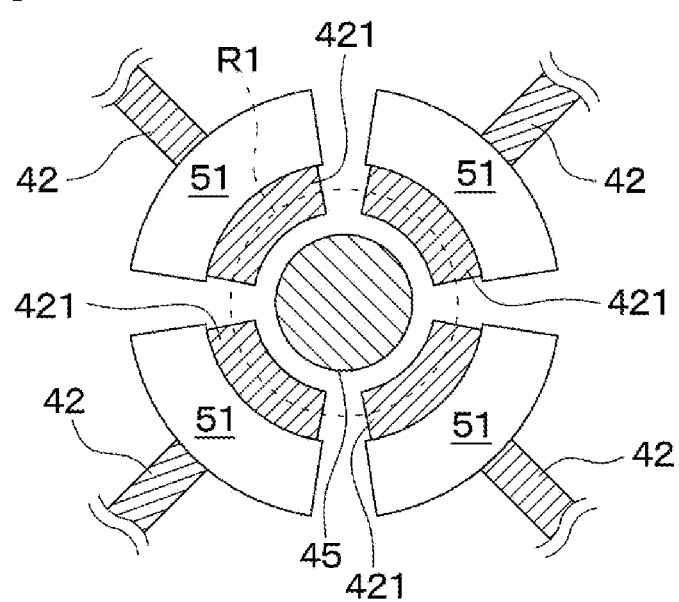
FIG. 24 is a diagram showing a top layout view of a mounting substrate corresponding to FIG. 10 according to a modification of a third embodiment.

In FIG. 23, in order to make it easier to understand the bonding state between the micro vibrator 2 and the mounting substrate 3, a predetermined region of the micro vibrator 2 including the connecting portion 22 and a predetermined region of the mounting substrate 3 including the divided inner frame portions 51 are shown, and the other parts of the micro vibrator 2 and the mounting substrate 3 are omitted. FIG. 24 shows only a predetermined region of the mounting substrate 3 including the divided inner frame portions 51 and omits other parts of the mounting substrate 3.

The mounting structure 1 of the present embodiment is different from the mounting structure 1 of the first embodiment on the point that the surface electrode 23 of the micro vibrator 2 and the electrode connection portion 421 of the mounting substrate 3 are in contact with each other and are directly bonded without the bonding member 52 interposed therebetween, for example, as shown in FIG. 23. Hereinafter, the difference from the first embodiment will be mainly described.

In the present embodiment, the surface electrode 23 is bonded to the electrode connection portions 421 of the mounting substrate 3 without interposing another member such as the bonding member 52 therebetween. Although not particularly limited, for example, the surface electrode 23 and the electrode connection portions 421 are made of a conductive material that can diffuse into each other, such as Al and Cu, and are bonded using diffusion bonding.

The surface electrode 23 can be bonded to the electrode connection portions 421 by, for example, the following process. For example, the micro vibrator 2 is placed on the mounting substrate 3, and the surface electrode 23 is brought into contact with the electrode connection portions 421, under an environment such as a reduced pressure or an inert gas atmosphere so that bonding surfaces of the surface electrode 23 and the electrode connection portion 421 are not oxidized. Then, the mounting substrate 3 is heated so that the temperature of the surface electrode 23 and the electrode connection portions 421 is higher than the eutectic point and lower than the melting point of their constituent materials, while applying pressure to the electrode connection portions 421 by the surface electrode 23. As a result, at the contact portions between the surface electrode 23 and the electrode connection portions 421, the mutual constituent materials diffuse into the other bulk, forming a eutectic layer. At this time, if necessary, a secondary pressurization with a higher pressure than the initial pressurization may be performed. Thereafter, when being cooled, the surface electrode 23 and the electrode connection portions 421 are directly bonded without going through a liquid phase and without interposing other members therebetween.

The bonding between the surface electrode 23 and the electrode connection portions 421 in the present embodiment can be referred to as "direct bonding", "solid phase bonding", "eutectic bonding", "diffusion bonding", and the like.

Also in the present embodiment, the mounting structure 1 that can achieve the similar effects to those of the first embodiment can be obtained. In addition, since the bonding member 52 is not used in the present embodiment, the voltage application wiring 42A and the voltage detection wiring 42B are not directly connected. Therefore, it is possible to achieve the effect of more reliably suppressing insulation failure.

Modification of Third Embodiment

For example, as shown in FIG. 24, the mounting substrate 3 may have an auxiliary electrode 45 in the facing region R1 facing the micro vibrator 2 and surrounded by the multiple electrode connection portions 421. The auxiliary electrode 45 is arranged, for example, at a distance from all the electrode connection portions 421 and is electrically independent of the electrode connection portions 421. The auxiliary electrode 45 serves to increase the bonding area between the micro vibrator 2 and the surface electrode 23 and improve the bonding strength between the micro vibrator 2 and the mounting substrate 3. The auxiliary electrode 45 may be connected to the voltage application wiring 42A or the voltage detection wiring 42B as long as the voltage application wiring 42A and the voltage detection wiring 42B are electrically independent.

Also in this modification, the mounting structure 1 that can achieve the similar effects to those of the third embodiment can be obtained. In addition, according to this modification, the auxiliary electrode 45 improves the bonding strength between the micro vibrator 2 and the mounting substrate 3, thereby obtaining the effect of further improving the bonding reliability.

Other Embodiments

Although the present disclosure has been described in accordance with the embodiments, it is understood that the present disclosure is not limited to such embodiments and structures. The present disclosure encompasses various modifications and variations within the scope of equivalents. In addition, various combinations and modes, and other combinations and modes including only one element, more elements, or less elements are also within the scope and idea of the present disclosure.

(1) For example, the mounting structure 1 may have a configuration in which the micro vibrator 2 does not have the branched electrodes 231, but has the bottom protrusion 24 and the mounting substrate 3 has the fitting recess 44. In this case, the mounting substrate 3 may have multiple separation grooves, or the electrode connection portions 421 may be directly bonded to the surface electrodes 23 without the bonding member 52 interposed therebetween. In this way, the mounting structure 1 can be configured by freely combining the constituent elements of the embodiments described above and their modifications, except when they are clearly incompatible.

Figure 25:
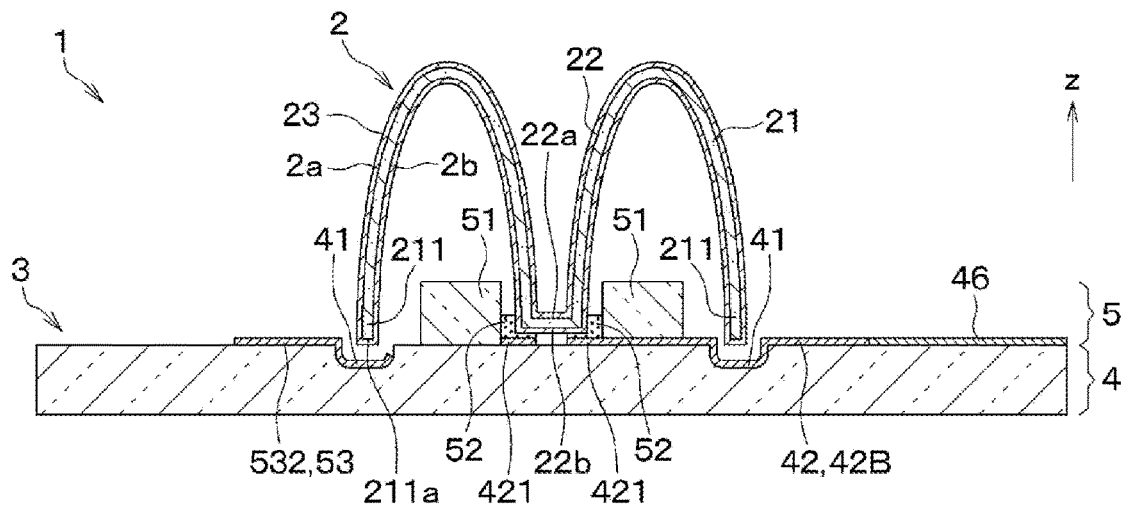
FIG. 25 is a diagram showing a cross-sectional view of an example of a mounting structure according to a modified embodiment.

(2) In addition, as shown in FIG. 25, for example, the mounting structure 1 may have a configuration in which the electrode portions 53 of the mounting substrate 3 do not have a base portion that constitutes the upper substrate 5, and are provided only by metal wirings 532. In this case, the electrode portion 53 is a portion of the metal wiring 532 that faces the lower surface 211a of the rim 211 of the micro vibrator 2, and can vibrate the curved surface portion 21 of the micro vibrator 2 in the z direction. The lower surface 211a of the rim 211 is a surface connecting the front surface 2a and the rear surface 2b of the micro vibrator 2 in the rim 211, and is the portion facing the mounting substrate 3. Further, in the mounting structure 1, the voltage application wiring 42A and the voltage detection wiring 42B may be connected to conductive films 46 formed on the lower substrate 4, instead of the divided outer frame portions 54 formed by the base portion of the upper substrate 5, so that the terminal portions are provided by the conductive films 46. The conductive film 46 may be integral with the wiring 42 or may be separate.

Figure 26:
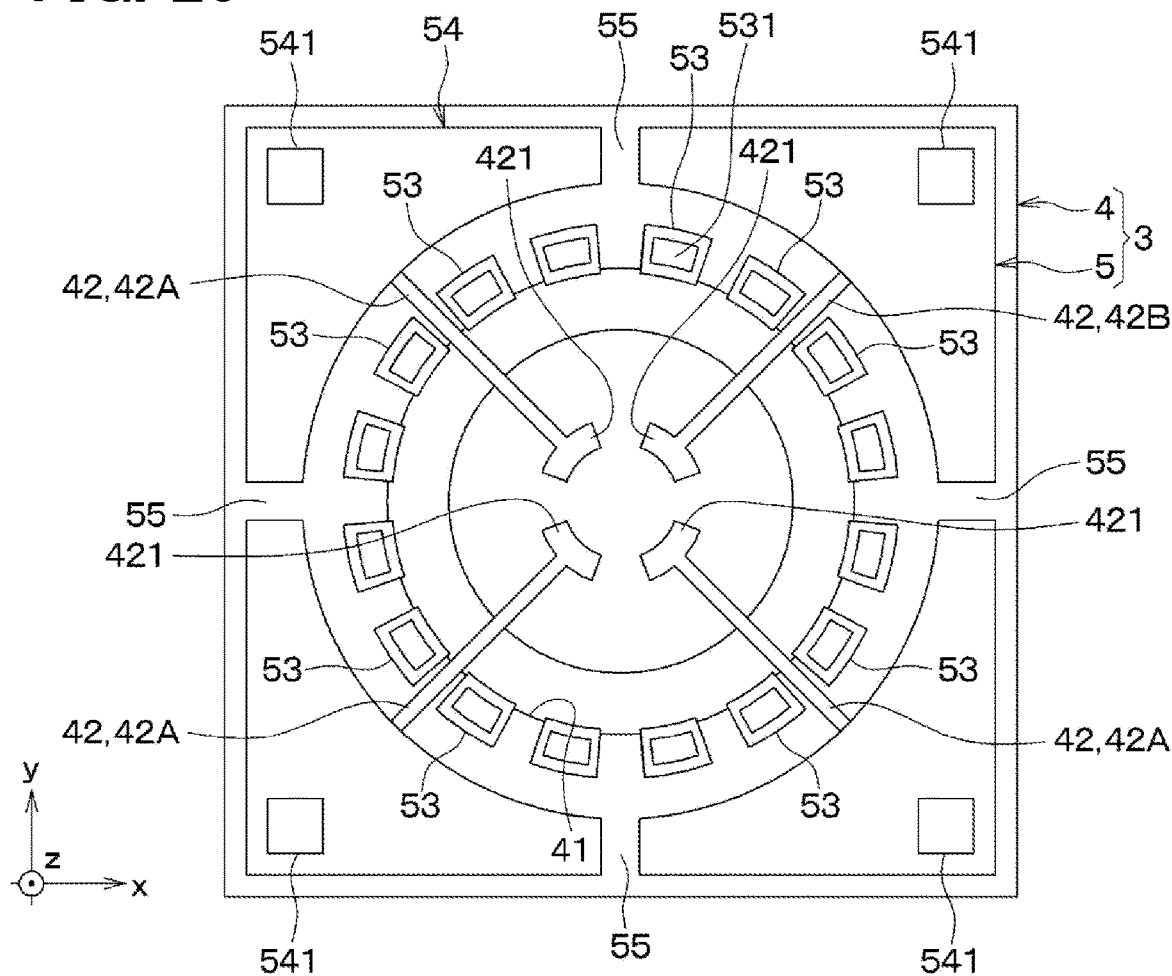
FIG. 26 is a diagram showing a top layout view of a mounting substrate according to another modified embodiment.
Figure 27:
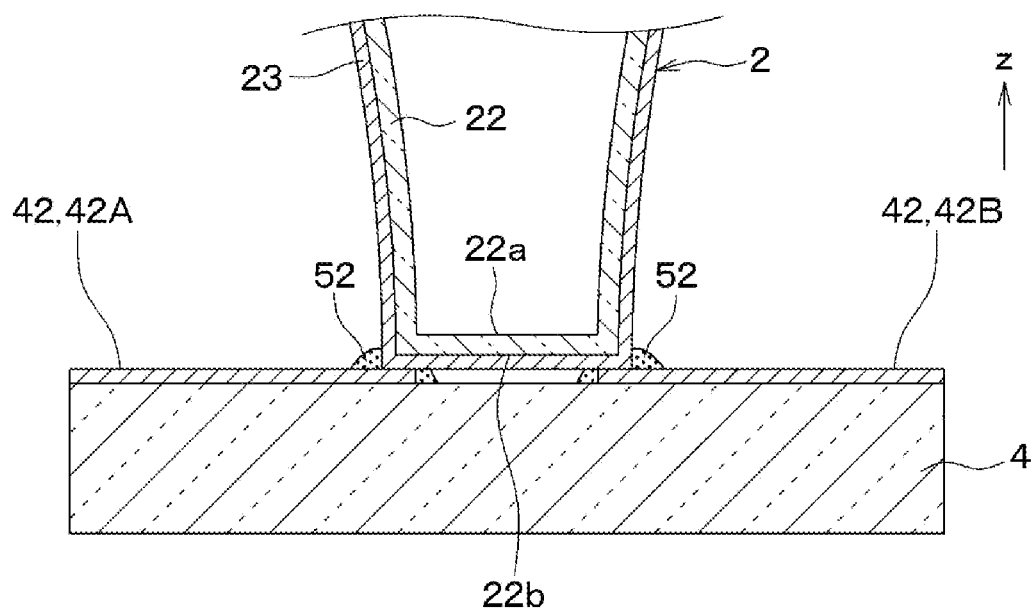
FIG. 27 is a diagram showing a connection structure between a surface electrode of a micro vibrator and a wiring of a mounting substrate, corresponding to FIG. 14, according to further another modified embodiment.
Figure 28:
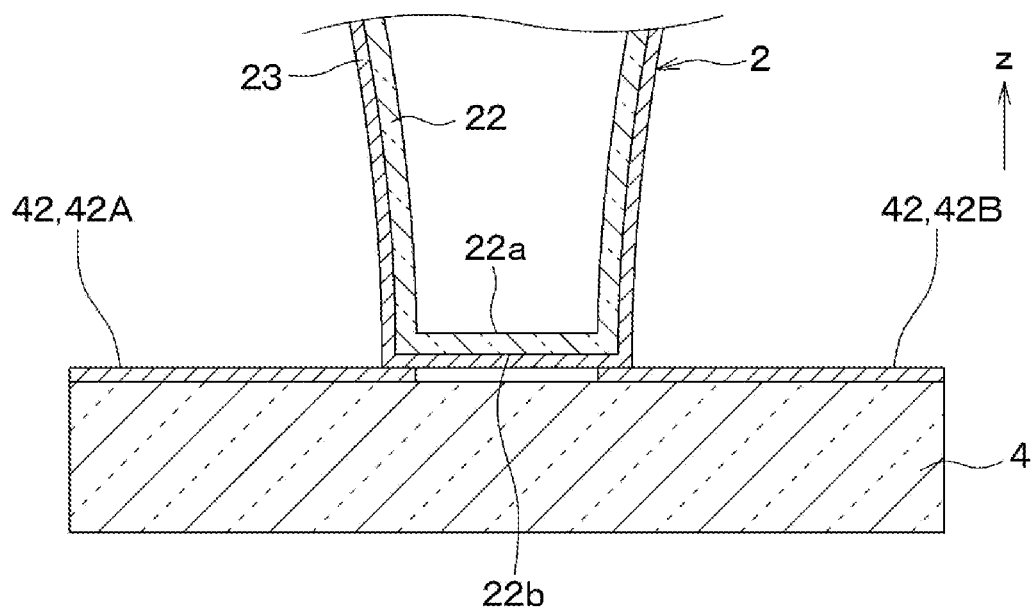
FIG. 28 is a diagram showing a connection structure between a surface electrode of a micro vibrator and a wiring of a mounting substrate, corresponding to FIG. 14, according to still another modified embodiment.

(3) As shown in FIG. 26, for example, the mounting structure 1 may have a configuration in which the mounting substrate 3 on which the micro vibrator 2 is mounted does not have the divided inner frame portions 51. In this case, the micro vibrator 2 may be bonded to the electrode connection portions 421 of the wirings 42 via the bonding member 52, for example, as shown in FIG. 27. Alternatively, the micro vibrator 2 may be mounted so that the surface electrode 23 and the electrode connection portions 421 of the wirings 42 are directly connected to each other, as shown in FIG. 28. In the former example shown in FIG. 27, the mounting substrate 3 may be preferably configured to have separation grooves 43 between the electrode connection portions 421 from the viewpoint of directly connecting the voltage application wiring 42A and the voltage detection wiring 42B by the bonding member 52.

Figure 29:
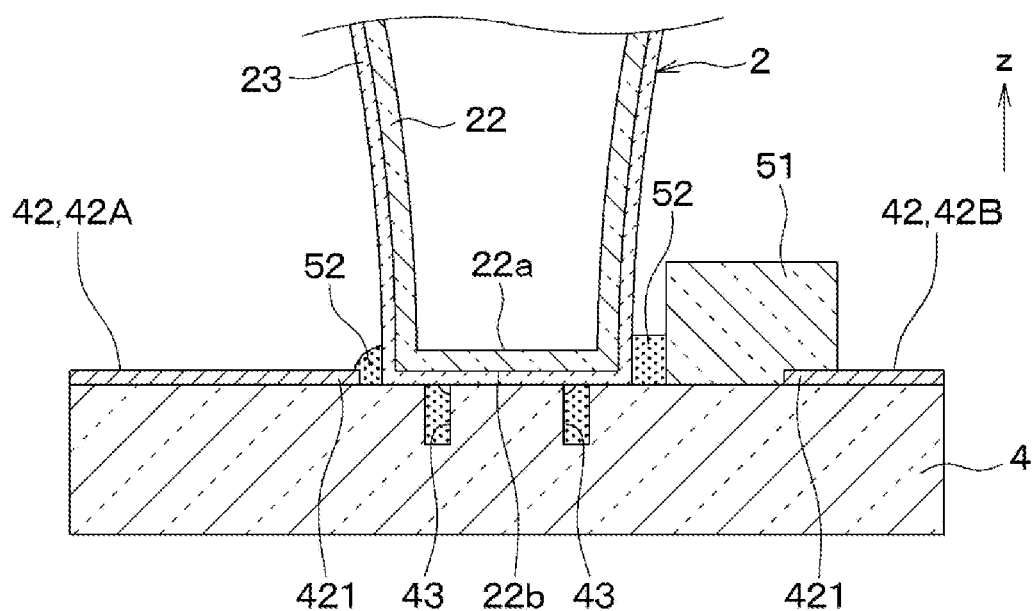
FIG. 29 is a diagram showing a connection structure between a surface electrode of a micro vibrator and a wiring of a mounting substrate, corresponding to FIG. 14, according to yet another modified embodiment.

(4) In the mounting structure 1, for example, as shown in FIG. 29, the electrode connection portion 421 of the wiring 42 may not extend to the facing region R1 of the mounting substrate 3 facing the connecting portion 22 of the micro vibrator 2, and may be connected to the surface electrode 23 via the bonding member 52 and the divided inner frame portion 51. In this case, for example, one end of the wiring 42 extends to a position directly below the divided inner frame portion 51 or outside of the facing region R1, but does not protrude into the facing region R1 or to a region inside the divided inner frame portion 51. At this time, the divided inner frame portion 51 is made of, for example, conductive silicon, and electrically connects the wiring 42 and the surface electrode 23 together with the bonding member 52.

(5) The constituent element(s) of each of the embodiment(s) described above is/are not necessarily essential unless it is specifically stated that the constituent element(s) is/are essential in the embodiment(s), or unless the constituent element(s) is/are obviously essential in principle. A quantity, a value, an amount, a range, or the like referred to in the description of the embodiments described above is not necessarily limited to such a specific value, amount, range or the like unless it is specifically described as essential or understood as being essential in principle. Further, in each of the embodiments described above, when the shape of an element or the positional relationship between elements is mentioned, the present disclosure is not limited to the specific shape or positional relationship unless otherwise particularly specified or unless the present disclosure is limited to the specific shape or positional relationship in principle.

What is claimed is:

1. A mounting structure comprising:
    a micro vibrator that has a curved surface portion with a hemispherical curved surface, a connecting portion extending from the curved surface portion toward a center of a hemispherical shape of the curved surface portion, and a surface electrode covering the connecting portion at least at a part and the curved surface portion at least at a part; and
    a mounting substrate that has two or more wirings and to which a part of the micro vibrator is connected, wherein
    the two or more wirings each have an electrode connection portion connected to a portion of the surface electrode covering the connecting portion at an end,
    the two or more wirings include a voltage application wiring to apply a voltage to the surface electrode and a voltage detection wiring to detect the voltage applied to the surface electrode, and
    the voltage application wiring is spaced away from the voltage detection wiring on the mounting substrate.

2. The mounting structure according to claim 1, wherein the mounting substrate is formed with a separation groove to separate the voltage detection wiring and the voltage application wiring from each other.

3. The mounting structure according to claim 1, wherein
    the surface electrode includes a plurality of branched electrodes with a same number as the electrode connection portions of the two or more wirings,
    the plurality of branched electrodes are disposed at positions covering a side wall surface of the connecting portion and corresponding to the electrode connection portions,
    the side walls surface of the connecting portion is exposed from the surface electrode at positions located between the plurality of branched electrodes, and
    each of the electrode connection portions is connected to different one of the plurality of branched electrodes through a bonding member.

4. The mounting structure according to claim 1, wherein
    the micro vibrator has a bottom protrusion on a mounting surface defined at a bottom of the connecting portion, and
    the mounting substrate has a facing region facing the connecting portion of the micro vibrator, and
    the mounting substrate is formed with a fitting recess to receive the bottom protrusion of the connecting portion therein in the facing region.

5. The mounting structure according to claim 1, wherein the electrode connection portions of the two or more wirings are partly in contact with and directly bonded to the surface electrode.

* * * * *